(12) United States Patent
Takeda et al.

(10) Patent No.: US 9,631,734 B2
(45) Date of Patent: Apr. 25, 2017

(54) FLUID CONTROL DEVICE MANIFOLD, MANIFOLD ASSEMBLING METHOD, AND CONNECTION TOOL

(71) Applicant: CKD CORPORATION, Komaki-shi, Aichi (JP)

(72) Inventors: Hideyuki Takeda, Kasugai (JP); Midori Nishigaki, Komaki (JP); Hiroki Iwata, Kasugai (JP)

(73) Assignee: CKD CORPORATION, Komaki-shi (JP)

( * ) Notice: Subject to any disclaimer, the term of this patent is extended or adjusted under 35 U.S.C. 154(b) by 29 days.

(21) Appl. No.: 14/435,957

(22) PCT Filed: Oct. 25, 2013

(86) PCT No.: PCT/JP2013/078904
§ 371 (c)(1),
(2) Date: Apr. 15, 2015

(87) PCT Pub. No.: WO2014/069344
PCT Pub. Date: May 8, 2014

(65) Prior Publication Data
US 2015/0267830 A1 Sep. 24, 2015

(30) Foreign Application Priority Data
Oct. 30, 2012 (JP) .................... 2012-239238

(51) Int. Cl.
*F15B 13/00* (2006.01)
*F16K 27/00* (2006.01)
(Continued)

(52) U.S. Cl.
CPC ............ *F16K 27/003* (2013.01); *B25B 27/10* (2013.01); *F16L 23/04* (2013.01); *F16L 23/162* (2013.01);
(Continued)

(58) Field of Classification Search
CPC ........... Y10T 137/0191; Y10T 137/598; Y10T 137/6116; Y10T 137/87885
See application file for complete search history.

(56) References Cited

U.S. PATENT DOCUMENTS 1,478,172 A * 12/1923 Clark .................... F16L 55/172
137/315.01
2,569,734 A * 10/1951 Saalfrank .............. F04B 43/086
137/315.01
(Continued)

FOREIGN PATENT DOCUMENTS

JP H06-28445 U 4/1994
JP 2000-117655 A 4/2000
(Continued)

OTHER PUBLICATIONS

Aug. 4, 2015 Notice of Reasons for Refusal issued in Japanese Patent Application No. 2014-544467.
(Continued)

*Primary Examiner* — R. K. Arundale
(74) *Attorney, Agent, or Firm* — Oliff PLC

(57) ABSTRACT

A fluid control device manifold includes a first body, a second body, and a connection part configured to interpose a seal member between the first and second bodies and allow a connecting tool to engage with engagement surfaces of the bodies. When a load is applied to the engagement surfaces to draw the first and second bodies close to each other, the seal member is press-fitted into the bodies. This press-fitted state is held by a clamp. One or both of the first and second bodies are internally provided with a plurality of the engagement surfaces extending in a nearly perpendicular direction to a drawing direction.

20 Claims, 32 Drawing Sheets

(51) Int. Cl.
*B25B 27/10* (2006.01)
*F16L 23/04* (2006.01)
*F16L 23/16* (2006.01)
*F16L 23/18* (2006.01)
*F16L 41/03* (2006.01)

(52) U.S. Cl.
CPC ............... *F16L 23/18* (2013.01); *F16L 41/03* (2013.01); *Y10T 29/539* (2015.01); *Y10T 137/0402* (2015.04); *Y10T 137/598* (2015.04); *Y10T 137/6116* (2015.04); *Y10T 137/877* (2015.04); *Y10T 137/87885* (2015.04)

(56) References Cited

U.S. PATENT DOCUMENTS

| | | | | |
|---|---|---|---|---|
| 3,952,760 | A | * | 4/1976 | Caldwell ................... F15C 3/04 137/82 |
| 2009/0091125 | A1 | * | 4/2009 | Takeda .................... B25B 27/10 285/88 |
| 2009/0250561 | A1 | * | 10/2009 | Takeda .................... B25B 27/10 248/68.1 |
| 2010/0132808 | A1 | * | 6/2010 | Nakata ................... F16K 27/003 137/315.01 |
| 2010/0148101 | A1 | * | 6/2010 | Narita .................... F16K 27/003 251/129.01 |

FOREIGN PATENT DOCUMENTS

| | | |
|---|---|---|
| JP | 3780277 B2 | 5/2006 |
| JP | 2008-089085 A | 4/2008 |
| JP | 2008-267428 A | 11/2008 |
| JP | 2010-048370 A | 3/2010 |
| KR | 20-0374340 Y1 | 1/2005 |

OTHER PUBLICATIONS

Oct. 8, 2015 Office Action issued in Korean Patent Application No. 10-2015-7010900.
Dec. 15, 2015 Office Action issued in Japanese Patent Application No. 2014-544467.
Nov. 26, 2013 International Search Report issued in International Patent Application No. PCT/JP2013/078904.
Mar. 28, 2016 Office Action issued in Korean Patent Application No. 10-2015-7010900.
Mar. 30, 2016 Office Action issued in Chinese Patent Application No. 201380057699.9.
Dec. 2, 2016 Office Action issued in Chinese Application No. 201380057699.9.

* cited by examiner

US 9,631,734 B2

FLUID CONTROL DEVICE MANIFOLD, MANIFOLD ASSEMBLING METHOD, AND CONNECTION TOOL

CROSS-REFERENCE TO RELATED APPLICATIONS

This is a US national phase application based on the PCT International Patent Application No. PCT/JP2013/078904 filed on Oct. 25, 2013, and claiming the priority of Japanese Patent Application No. 2012-239238 filed on Oct. 30, 2012, the entire contents of which are herewith incorporated by reference.

TECHNICAL FIELD

The present invention relates to a fluid control device manifold including a first body, a second body, and a connection part configured to interpose a seal member between the first and second bodies in a press-fitted state obtained by engaging engagement surfaces of the first body and the second body with a connecting tool and applying a load to the engagement surfaces to draw the first body and the second body toward each other, the press-fitted state being retained by a clamp.

BACKGROUND ART

One example of a conventional process of press-fitting a first body and a second body into a seal member will be explained as below.

FIG. 25 is an external perspective view of a connecting tool in a conventional art. FIG. 26 is a cross section view of bodies and a seal member temporarily inserted therein in the conventional art.

Firstly, a first arm engagement part 101 and a second arm engagement part 102 of a connecting tool 100 shown in FIG. 25 are mounted on a mounting groove 4m and a mounting groove 5m shown in FIG. 26.

Secondly, hand grips 104 of the connecting tool 100 shown in FIG. 25 are pulled or drawn toward each other to come the first arm engagement part 101 and the second arm engagement part 102 close to each other about a grip shaft 105 serving as a fulcrum, thereby press-fitting the first body 2 and the second body 3 into the seal member 6. After press-fit in the seal member 6, respective connection parts are held by a clamp not shown.

A fluid control device manifold including the first body and the second body connected to each other is fixed to a fixed plate by another fixing member different from the clamp through the use of the mounting grooves 4m and 5m.

RELATED ART DOCUMENTS

Patent Documents

Patent Document 1: JP-A-2010-48370

SUMMARY OF INVENTION

Problems to be Solved by the Invention

To press-fit the first body 2 and the second body 3 into the seal member 6, a large drawing load is required. In Patent Document 1, therefore, the first and second bodies 2 and 3 are provided with the mounting groove 4m and the mounting groove 5m to withstand the large load and allow uniform press-fitting of the seal member 6. However, as shown in FIG. 26, the space for the mounting grooves 4m and 5m increases the distance of the first body 2 and the second body 3, resulting in impediment to size reduction.

Further, the engagement parts of a first clamp member and a second clamp member of the connecting clamp may be erroneously disengaged by external force.

Fixing the manifold to the fixed plate also needs a dedicated fixing member and a groove space for attachment of the dedicated fixing member. Thus, the number of components is increased, which runs counter to size reduction.

In a cross section view in FIG. 15 showing a state where a fluid control device manifold in a conventional art is fixed to a fixed plate, a first body 2B1 and a second 2B2 are connected and clamped by a clamp 60B, and then directly fixed to a fixed plate 80 with mounting bolts through the bodies. In this case, a gap Z is caused due to variations in size from a fixed surface of each body to the connection part. When the bodies are forcedly fastened with the mounting bolts, excessive loads may be applied to the bodies and the connection parts, leading to fluid leakage and operation failures.

The present invention has a purpose to provide a fluid control device manifold, a manifold assembling method, and a connecting tool, capable of solving the above problems.

Means of Solving the Problems

An effective means to achieve the above purpose will be explained below by showing advantages and others as needed.

(1) A fluid control device manifold includes a first body, a second body, and a connection part configured to interpose a seal member between the first and second bodies, the seal member being in a press-fitted state in the first and second bodies in a manner that a connecting tool is engaged with engagement surfaces of the first body and the second body and a load is applied to the engagement surfaces to draw the first body and the second body toward each other, and the press-fitted state is held by a clamp, wherein a main part of either or both of the first body and the second body is provided, on an inner side, with the engagement surface extending in a nearly perpendicular direction to a drawing direction.

In the above configuration (1), the bodies are drawn by using the engagement surface(s) provided on the inner side of the main part(s). Thus, any additional mounting groove needs not be provided and also a space thereof is unnecessary. Accordingly, the fluid control device manifold can be reduced in size. Further, a plurality of engagement surfaces can increase an engagement area, allowing the drawing load to be dispersed. This enables applying the load without distorting or damaging the bodies.

(2) In the fluid control device manifold set forth in (1), preferably, the engagement surfaces include a surface provided in a screw hole of either or both of the first body and the second body.

In the above configuration (2), a surface of a hole provided as the screw hole on a side close to the connection part is also used as the engagement surface. Accordingly, when the screw hole is formed through the body, the engagement surface can be provided in a position deep or away from the end face of the body, thereby allowing uniform application of the drawing load to the seal member over a wide range. Accordingly, it is possible to prevent the seal member from becoming press-fitted on a slant.

(3) In the fluid control device manifold set forth in (1) or (2), preferably, the engagement surfaces include a surface provided in a molding cutout of either or both of the first body and the second body.

In the above configuration (3), the cutout formed to improve a flow of molten resin, prevent resin sink, or reduce molding resin material can also be used as-is as the engagement surface. Thus, no space for providing the engagement surface is needed.

(4) In the fluid control device manifold set forth in one of (1) to (3), preferably, the engagement surface has a range determined such that a farthest distance from an end face of the main part on a side for insertion of a connecting tool is larger than a distance between the end face and a center axis of the seal member.

In the above configuration (4), the range serving as the engagement surface reaches a position beyond the center axis of the seal member at a distance from the main-part end face. When the drawing load is applied to this engagement surface, the load acts on both sides of the center axis of the seal member. This can prevent the seal member from becoming press-fitted on a slant.

(5) In the fluid control device manifold set forth in one of (1) to (4), preferably, either or both of the first body and the second body are provided with at least two or more valve seats, and the engagement surfaces include a partition wall between the valve seats.

In the above configuration (5), the partition wall surface can be used as the engagement surface. The partition wall surface has a wide engagement area and high structural strength. Thus, such a wide engagement area can disperse the drawing load. The structural strength enables the load application to the bodies without distorting or damaging the bodies. This can prevent defects such as fluid leakage and operation failure.

(6) In the fluid control device manifold set forth in one of (1) to (5), preferably, the clamp includes a first clamp member and a second clamp member, the clamp is configured to clamp the connection part, and the first clamp member includes a mounting surface to be fixed to a fixed plate, the first clamp member and the second clamp member are unable to disassemble when the mounting surface contacts with the fixed plate.

In the above configuration (6), the clamp holds the connection part and fixes the fluid control device manifold to the fixed plate. Further, the clamp is less likely to disengage as long as it is mounted on the fixed plate. Thus, any mounting groove for fixation and a space thereof are not needed. Any dedicated fixing member is therefore unnecessary. Further, erroneous disengagement of the clamp can be prevented.

In the fluid control device manifold set forth in (7), preferably, the first clamp member engages with a portion of the connection part exceeding one-half of an entire circumference of the connection part.

In the above configuration (7), since the first clamp member engages with a portion of the connection part more than one-half of the entire circumference, temporary joint with the connection part can be easily performed with the first clamp member alone. This leads to improved assembling workability.

(8) In the fluid control device manifold set forth in one of (1) to (7), preferably, the clamp and the connection part have engagement surfaces parallel with each other.

In the above configuration (8), variations in distance between the positions of the connection part and the clamp member and the fixed plate are absorbed by movement of the connection part within the clamp. Thus, the fluid control device manifold can be fixed to the fixed plate without receiving unnecessary load.

(9) In the fluid control device manifold set forth in one of (1) to (8), preferably, the first body and the second body each include two or three valve seats and the connection part includes connection parts in more than one place.

The above configuration (9) can be applied to any manifold in which the number of valve seats is four or more. Accordingly, the types of the bodies need only two.

(10) In the fluid control device manifold set forth in one of (1) to (9), preferably, an other component is mounted on either or both of the first body and the second body after the first body and the second body are drawn toward each other to place the seal member in the press-fitted state.

The above configuration (10) can utilize the engagement surfaces covered by an other component after assembling. Furthermore, since projections and depressions of the engagement surfaces are covered by engagement, a good appearance can be achieved.

(11) In a method for assembling a manifold including a first body, a second body, the method including: interposing a seal member between the first and second bodies; engaging a connecting tool with the first and second bodies; applying a load to engagement surfaces of the first and second bodies to draw the first and second bodies toward each other so that the seal member is placed in a press-fitted state; and holding the press-fitted state by a clamp, preferably, the method utilizes a plurality of the engagement surfaces located on an inner side of a main part of either or both of the first body and the second body, the engagement surfaces each extending in a nearly perpendicular direction to a drawing direction.

In the above configuration (11), the bodies are drawn by use of the engagement surfaces on the inner side of the main parts. Thus, any additional mounting groove needs not be provided and also a space thereof is unnecessary. Accordingly, the fluid control device manifold can be reduced in size. Further, the plurality of engagement surfaces can increase an engagement area, thereby allowing the drawing load to be dispersed. This enables applying the load without distorting or damaging the bodies.

(12) In a connecting tool for applying a load to engagement surfaces of a first body and a second body between which a seal member is interposed, drawing the first body and the second body toward each other so that the seal member is placed in a press-fitted state in the first body and the second body, preferably, the connecting tool includes engagement surfaces engageable with a plurality of the engagement surfaces located on an inner side of a main body of either or both of the first body and the second body, the engagement surfaces each extending in a nearly perpendicular direction to a drawing direction.

In the above configuration (12), since the bodies are drawn by use of the engagement parts located on the inner side of the main part(s), any additional mounting groove needs not be provided and thus a space thereof is unnecessary.

Effects of the Invention

According to the present invention, it is possible to press-fit a first component and a second component in a seal member without using a mounting groove.

MODE FOR CARRYING OUT THE INVENTION

A detailed description of a preferred embodiment of a fluid control device manifold, a manifold assembling method, and a connecting tool embodying the present invention will now be given referring to the accompanying drawings.

First Embodiment

Whole Structure of Fluid Control Device Manifold

Figure 1:
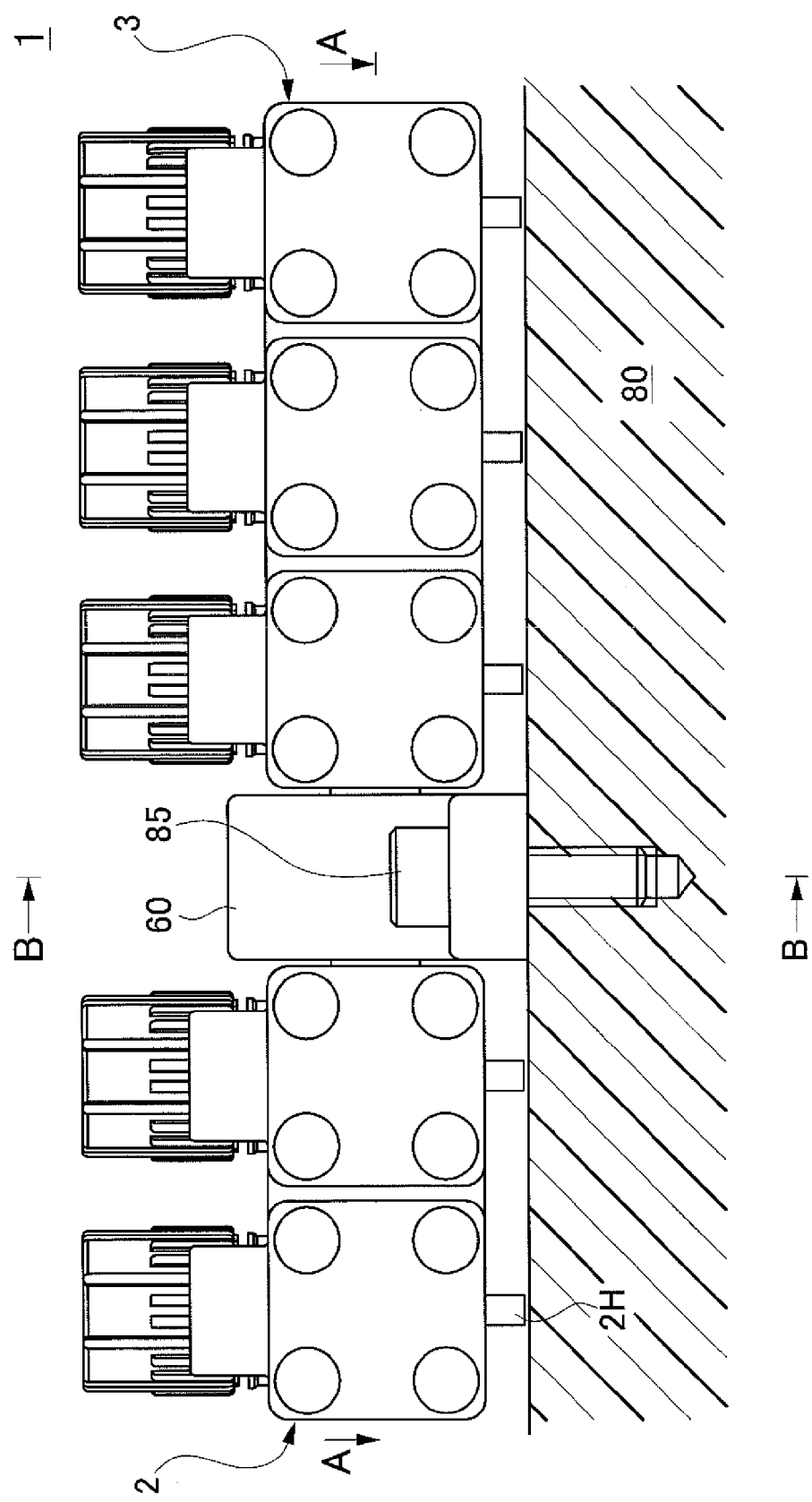
FIG. 1 is a top view of a fluid control device manifold fixed to a fixed plate in a first embodiment.
Figure 2:
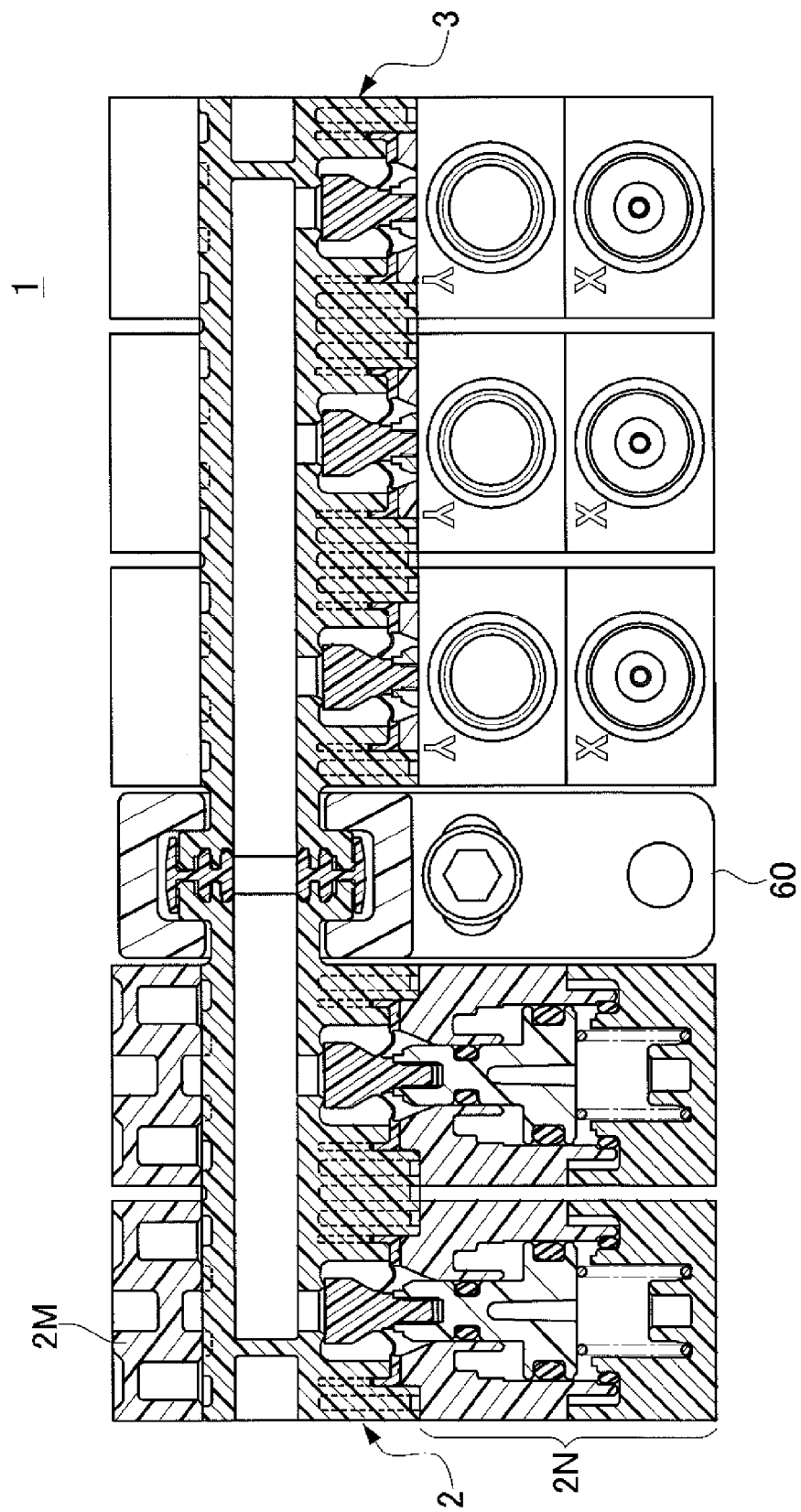
FIG. 2 is an A-A cross section view of the fluid control device manifold shown in FIG. 1 in the first embodiment.

FIG. 1 is a top view of a fluid control device manifold fixed to a fixed plate in the first embodiment. FIG. 2 is an A-A cross section of the fluid control device manifold of FIG. 1 in the first embodiment. As shown in FIGS. 1 and 2, the fluid control device manifold 1 includes a first body 2, a second body 3, a seal member 6 (covered by a clamp 60 and thus invisible in FIGS. 1 and 2), and the clamp 60.

Whole Structure of First Body and Second Body

The first body 2, the second body 3, and the seal member 6 are fluid control devices operative to flow a high-corrosive liquid and therefore they are made of resin having high chemical resistance.

Figure 4:
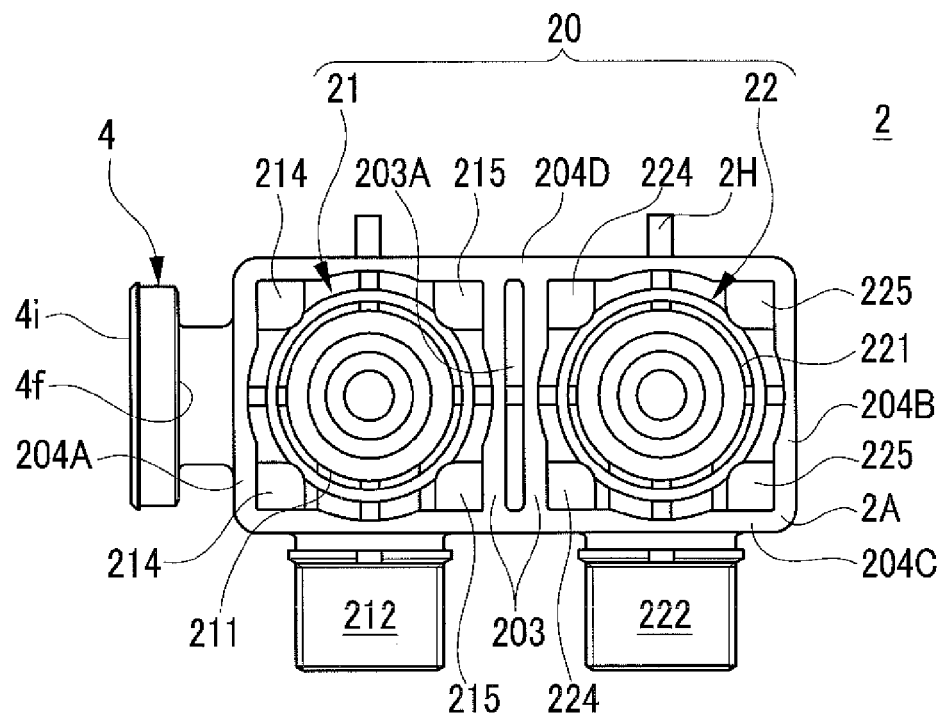
FIG. 4 is a top view of a first body in the first embodiment.
Figure 5:
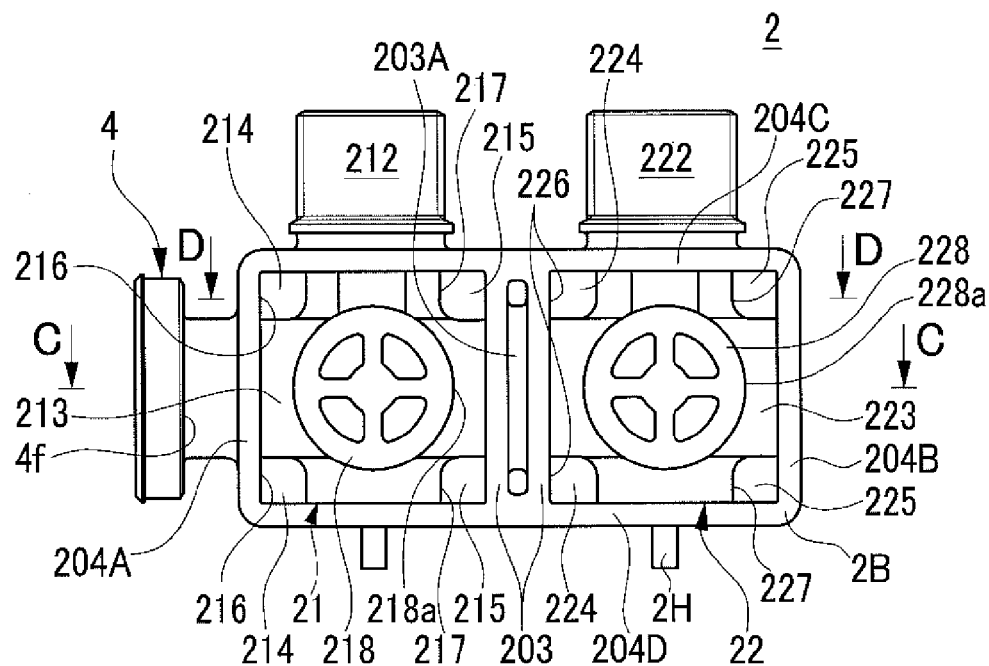
FIG. 5 is a lower view of the first body in the first embodiment.
Figure 8:
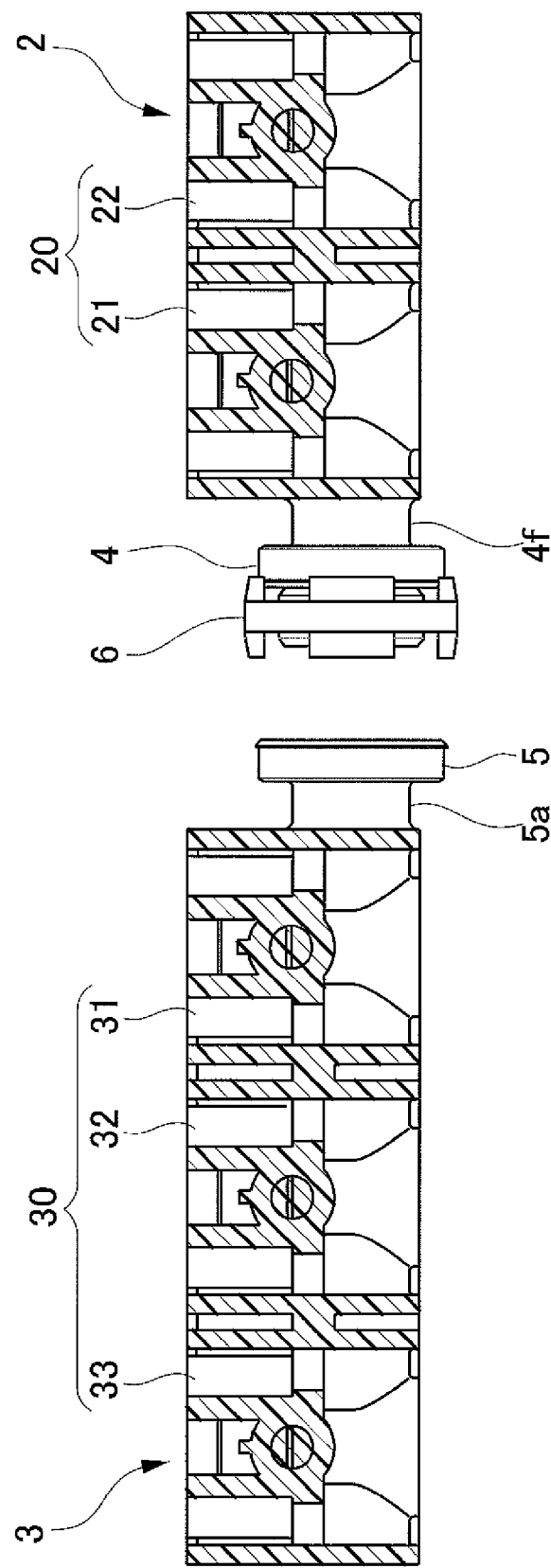
FIG. 8 is a diagram showing a procedure (a first step) for assembling the first body and a seal member shown in FIG. 10 in the first embodiment.

FIG. 4 is a top view of the second body in the first embodiment. FIG. 5 is a lower view of the first body in the first embodiment. FIG. 8 is a procedure (a first step) for assembling the first body and the seal member shown in FIG. 10 in the first embodiment. As shown in FIGS. 4 and 5, the first body 2 includes a main part 20 having a nearly rectangular parallelepiped shape, a first connection part 4 extending from the main part 20, a first port 212 and a second port 222. Similarly, the second body 3 includes, as shown in FIG. 8, a main part 30 having a nearly rectangular parallelepiped shape, a second connection part 5 extending from the main part 30, and ports. Since the first body 2 and the second body 3 are almost identical in structure and operation advantages, the following explanation is given to the details of the first body 2, and the explanation of the second body 3 is omitted.

<Connection Part Structure of First Body and Second Body>

Figure 6:
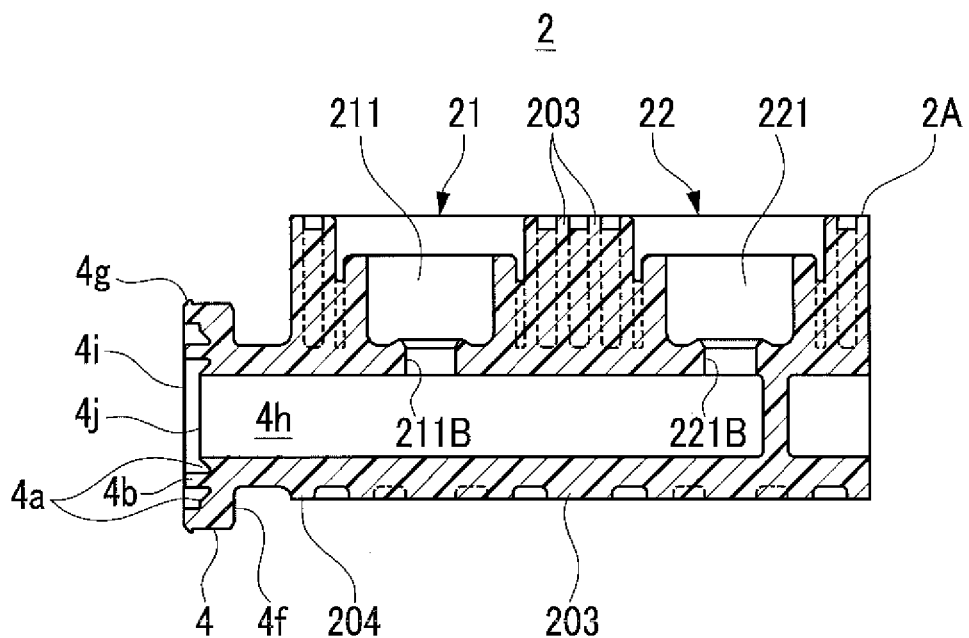
FIG. 6 is a C-C cross section of the first body shown in FIG. 5 in the first embodiment.

FIG. 6 is a C-C cross section view of the first body shown in FIG. 5 in the first embodiment. In FIG. 6, the first connection part 4 has a cylindrical shape formed with a flow passage 4h having a first passage opening 4j opening at a first connection-part end face 4i. This end face 4i of the first connection part 4 is formed with an annular projection 4b and seal grooves 4a along inner and outer circumferences of the projection 4b, which are located concentrically with the opening 4j. On the outer circumference of the end face 4i, a protruding portion 4g is provided in a protruding manner.

As shown in FIGS. 4 and 5, the first connection part 4 is annually formed with a first connection-part holding surface 4f which will engage with the clamp 60 mentioned later. A connecting tool is not inserted for engagement with the holding surface 4f. The holding surface 4f is a flat surface.

<Structure of Seal Member>

The seal member 6 is made of resin such as PFA, relatively hard and corrosion-resistant. The seal member 6 includes a main part 11, grip parts 12, and a web part 13.

Figure 23:
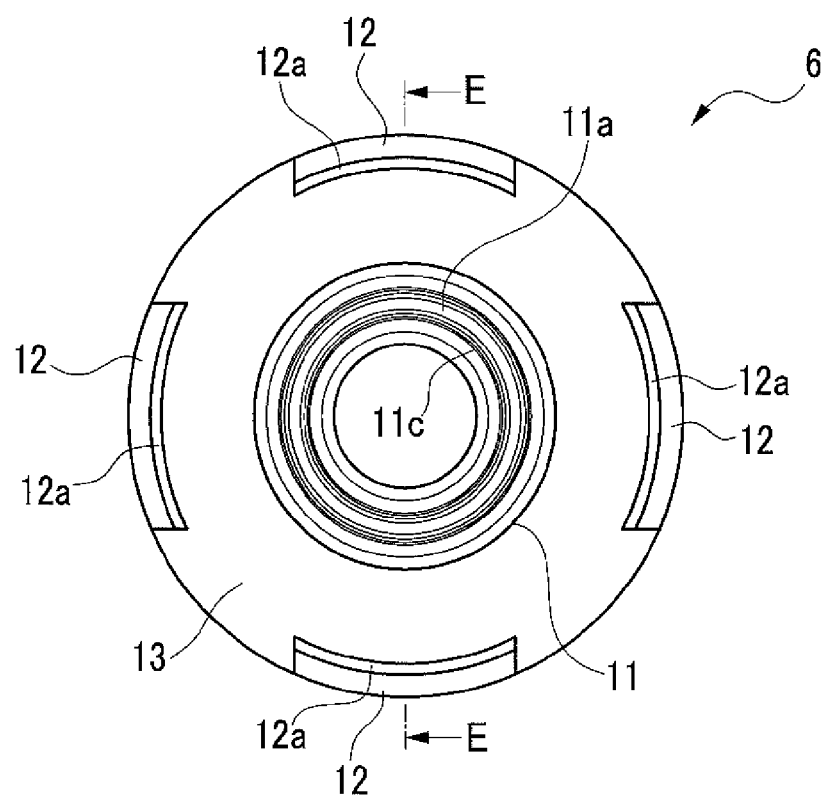
FIG. 23 is a plan view of the seal member in the first embodiment.
Figure 24:
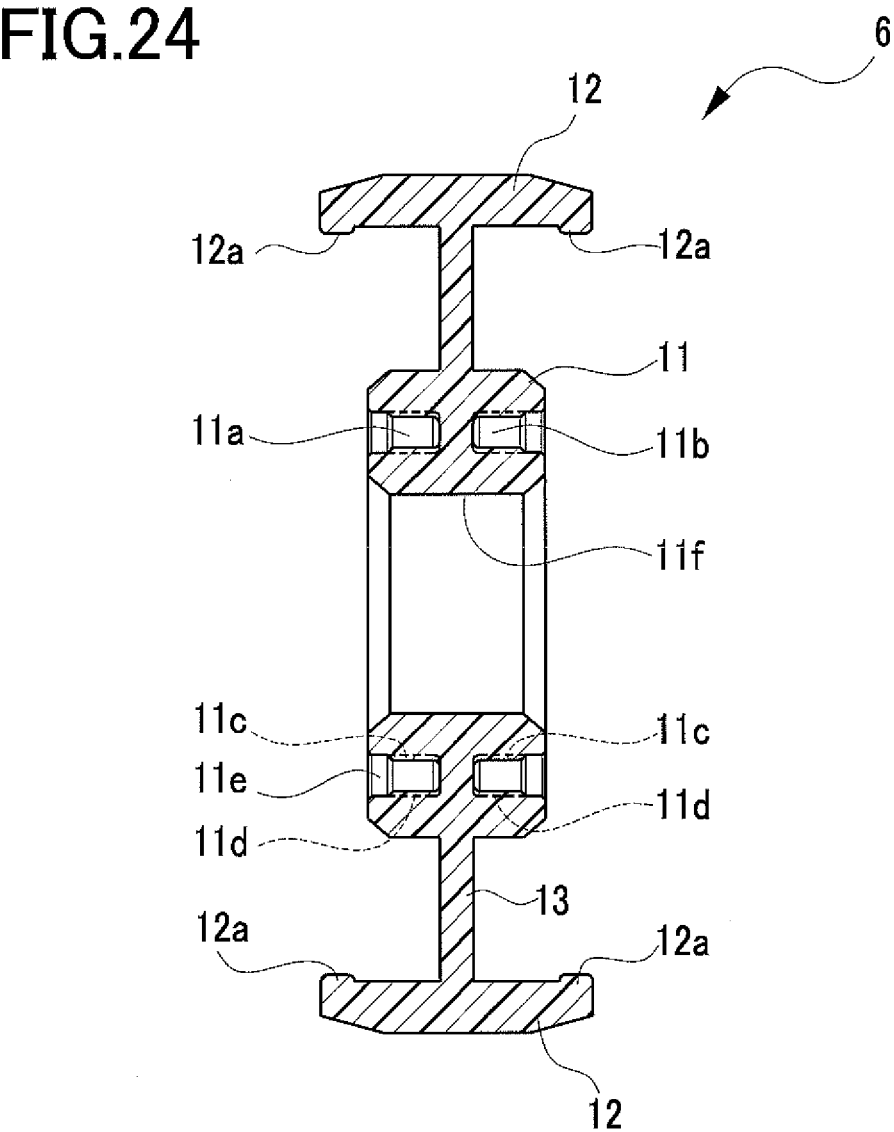
FIG. 24 is an E-E cross section view of the second body in the first embodiment.
Figure 25:
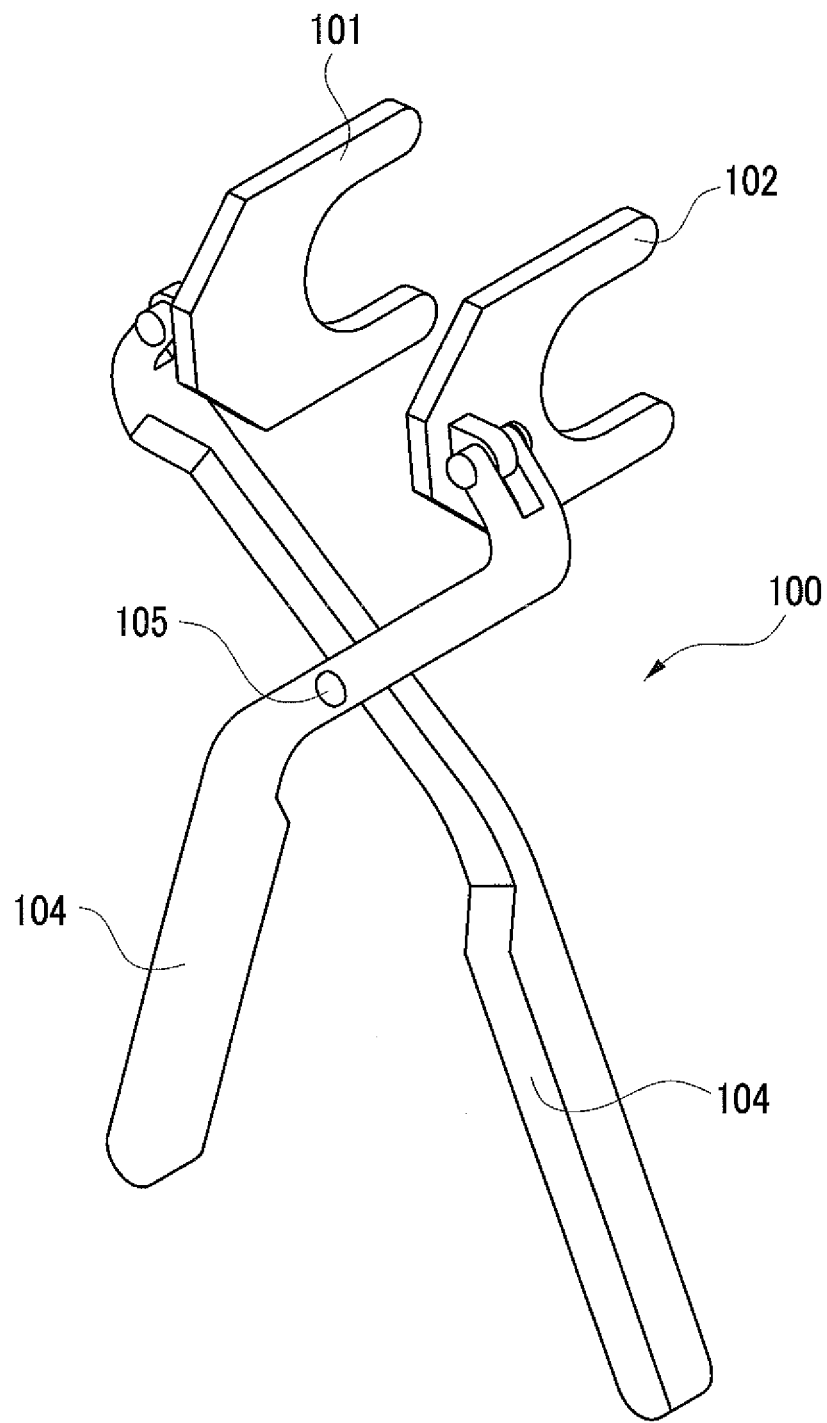
FIG. 25 is an external perspective view of a connecting tool in a conventional art.
Figure 26:
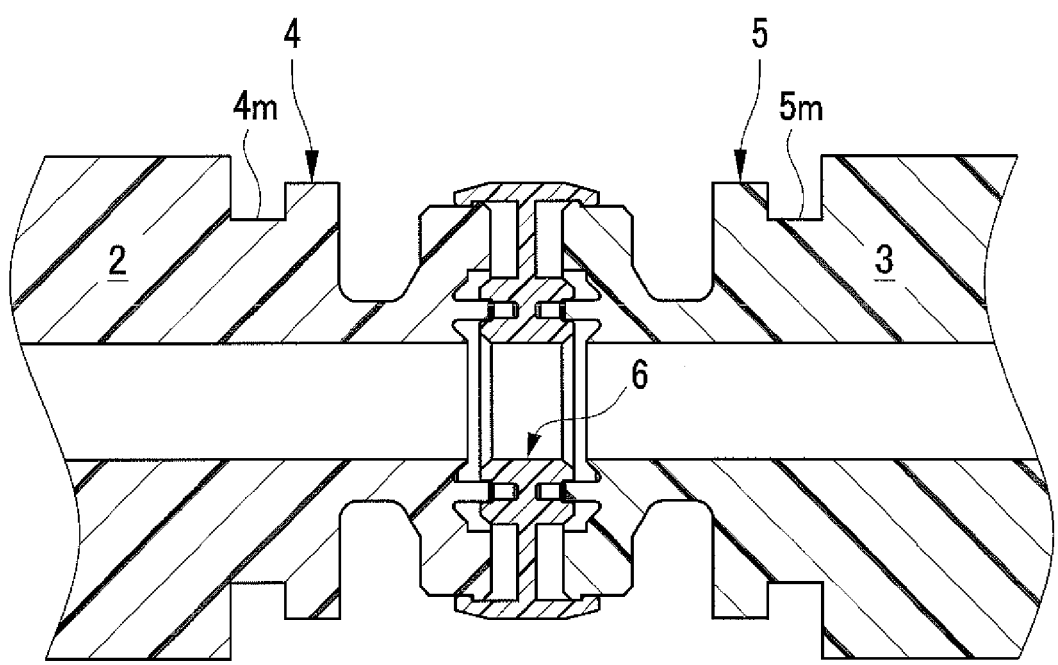
FIG. 26 is a cross section view of bodies and a seal member temporarily inserted therein in the conventional art.

FIG. 23 is a plan view of the seal member in the first embodiment. FIG. 24 is an E-E cross section view of the seal member in the first embodiment. As shown in FIGS. 23 and 24, the seal-member main part 11 is a cylindrical component having a symmetric cross section, formed with an inner surface 11f defining a flow passage, and annular grooves 11a and 11b on both end faces in which annular protrusions 4b and 5b of the first and second connection parts 4 and 5 are respectively press-fitted.

A groove width of each of the annular grooves 11a and 11b shown in FIG. 24 includes a guide portion 11e formed to be identical to or slightly larger than the thickness of each of the annular projections 4b and 5b of the first connection part 4 and the second connection part 5, and a portion located behind the guide portion 11e and provided with press-fit allowances 11c and 11d each indicated by a solid line and a broken line, this portion being smaller than the thickness of each of the annular projections 4b and 5b of the first connection part 4 and the second connection part 5.

The seal member main part 11 is provided, on an inner peripheral surface and an outer peripheral surface, with inclination corresponding to inclination of the bottoms of seal grooves 4a and 5a. When the annular projections 4b and 5b of the first and second connection parts 4 and 5 are press-fitted in the annular grooves 11a and 11b, their inclined surfaces come into contact with each other, thereby narrowing the groove width of each annular groove 11a and 11b, thus generating a force to maintain a press-fitted state. This prevents deterioration of seal strength.

As shown in FIGS. 23 and 24, the seal member 6 includes the web part 13 annularly formed extending radially outward from the outer peripheral surface of the main part 11. An outer edge of the web part 13 is integrally formed with a plurality of grip parts 12 arranged at predetermined intervals. Each of the grip parts 12 includes hook portions 12a protruding inward (toward the center) to hook and engage with the protruding portions 4g and 5g of the first and second connection parts 4 and 5. In FIG. 24, the outer circumferential line of the grip parts 12 is omitted to facilitate understanding of the shape of the seal member 6.

<Structure of Main Parts of First Body and Second Body>

As shown in FIGS. 4 and 5, the main part 20 includes a first operation part 21 and a second operation part 22 arranged side by side in line.

Figure 7:
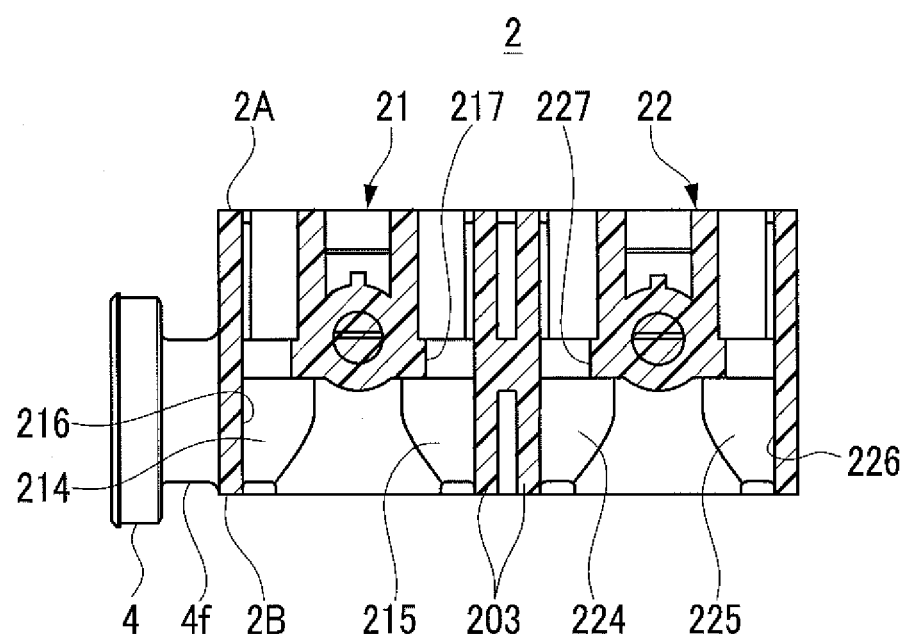
FIG. 7 is a D-D cross section of the first body shown in FIG. 5 in the first embodiment.

As shown in FIGS. 4 and 5, partition walls 203 are provided between the first operation part 21 and the second operation part 22. FIG. 7 is a D-D cross section view of the first body shown in FIG. 5 in the first embodiment. The partition walls 203 are formed to extend from an upper surface 2A to a lower surface 2B and in nearly parallel with the first connection-part end face 4i as shown in FIG. 7. The partition walls 203 are formed with a thick thickness including a cutout 203A to increase the strength enough to resist the load on the walls.

When surfaces 226 of the partition wall 203 opposite the first connection-part end face 4i are used as engagement surfaces, a wide engagement area is ensured, enabling dispersion of the drawing load and enhancement of the strength, so that the load can be applied without distorting or damaging the body members.

As shown in FIGS. 4 and 6, a first valve chamber 211 and a second valve chamber 221 are formed in the first body 2 on an upper surface 2A side.

As shown in FIG. 6, the first valve chamber 211 is communicated with the flow passage 4h through a first valve hole 211B and the second valve chamber 221 is communicated with the flow passage 4h through a second valve hole 221B.

As shown in FIGS. 4 and 5, the nearly rectangular parallelepiped main part 20 has four side surfaces defined by outer peripheral walls 204A to 204D. The outer peripheral wall 204A is provided with the first connection part 4. The outer peripheral walls 204A and 204B are parallel with the partition walls 203. Further, the outer peripheral wall 204C and the outer peripheral wall 204D are parallel with each other. The partition walls 203 and the outer peripheral wall 204A are perpendicular to the outer peripheral wall 204D. The outer peripheral wall 204C is provided with the first port 212 and the second port 222 in a vertical direction.

As shown in FIGS. 4 and 5, body protruding portions 2H are provided in positions near the centers of the first port 212 and the second port 222 on the outer peripheral wall 204D side. The height of each protruding portion 2H is almost equal to the distance to the fixed plate 80 as shown in FIG. 1. Accordingly, the protruding portions 2H receive a load applied thereto when tubes are separately inserted in the first port 212 and the second port 222 and thus can prevent warping of the first body 2 toward the fixed plate. In particular, it is effective when the clamp is fixed on one side with respect to the first body.

As shown in FIG. 5, at four corners of the first operation part 21, first screw holes 214 and second screw holes 215 are formed. These first screw holes 214 and second screw holes 215 are through holes extending from the upper surface 2A to the lower surface 2B and allowing insertion of mounting screws for fastening a valve element and a valve drive section 2N mounted on the upper surface 2A of the first operation part 21 to a bottom plate 2M mounted on the lower surface 2B by interposing the first operation part 21 therebetween. Further, surfaces defining the first screw holes 214 and the second screw holes 215, opposite the first connection-part end face 4i, are respectively formed as first screw hole engagement surfaces 216 and second screw hole engagement surfaces 217.

As shown in FIG. 5, at four corners of the second operation part 22, first screw holes 224 and second screw holes 225 are formed. As in the first operation part 21, first screw hole engagement surfaces 226 and second screw hole engagement surfaces 227 are formed.

Since the screw holes are through holes, the engagement surfaces can be provided in deep positions away from the end face of the body. Thus, at the time of press-fitting of the seal member, the drawing load can be more uniformly applied to the first body 2 and second body 3.

The first screw holes 214, second screw holes 215, first screw holes 224, and second screw holes 225 are made of resin by molding using a die. These screw holes are not only formed as simple through hole for screw insertion but also provided with molding cutouts to improve a flow of molten resin during molding, prevent molding sink, and reduce unnecessary resin material. Accordingly, those screw holes can be utilized as engagement surfaces having a wider area beyond simple screw holes.

A first bottom 218 of the first operation part 21 has a cylindrical shape having a cylindrical curved surface including a portion nearly opposite the first connection-part end face 4i, this portion being able to be used as a first bottom engagement surface 218a. Similarly, a side surface of a second bottom 228 of the second operation part 22 can be utilized as a second bottom engagement surface 228a.

Of molded surfaces of the main part 20 formed by a die, the surfaces nearly opposite the first connection-part end face 4i can be utilized directly as the engagement surfaces. Thus, the range of choices of shape and position of the engagement surfaces can be broadened.

The range of each of the first screw holes engagement surfaces 216, the second screw hole engagement surfaces 217, first screw hole engagement surfaces 226, and second screw hole engagement surfaces 227 is set so that a distance or position farthest from the lower surface 2B of the main part 20 is longer than a distance between the lower surface 2B and the center axis Y of the seal member 6 (corresponding to the center axis of the flow passage 4h in the present embodiment). Accordingly, first engagement protruding portions 274 and 276 and second engagement protruding portions 275 and 277 of a first engagement part 27 which are engageable in the first screw hole engagement surfaces 216 and the second screw hole engagement surfaces 217 of the outer peripheral part surrounding the flow passage walls 213 and 223, the first screw hole engagement surfaces 226, and the second screw hole engagement surfaces 227 are inserted therein deep to a position above the center axis Y of the seal member 6 (corresponding to the center axis of the flow passage 4h). The position reaches, or corresponds to, three-quarters of the entire circumference of the annular groove 11a of the seal member 6. This configuration enables applying the press-fitting load (the drawing load) almost uniformly to the entire circumference of the annular groove 11a of the seal member 6.

<Structure of the Clamp>

Figure 3:
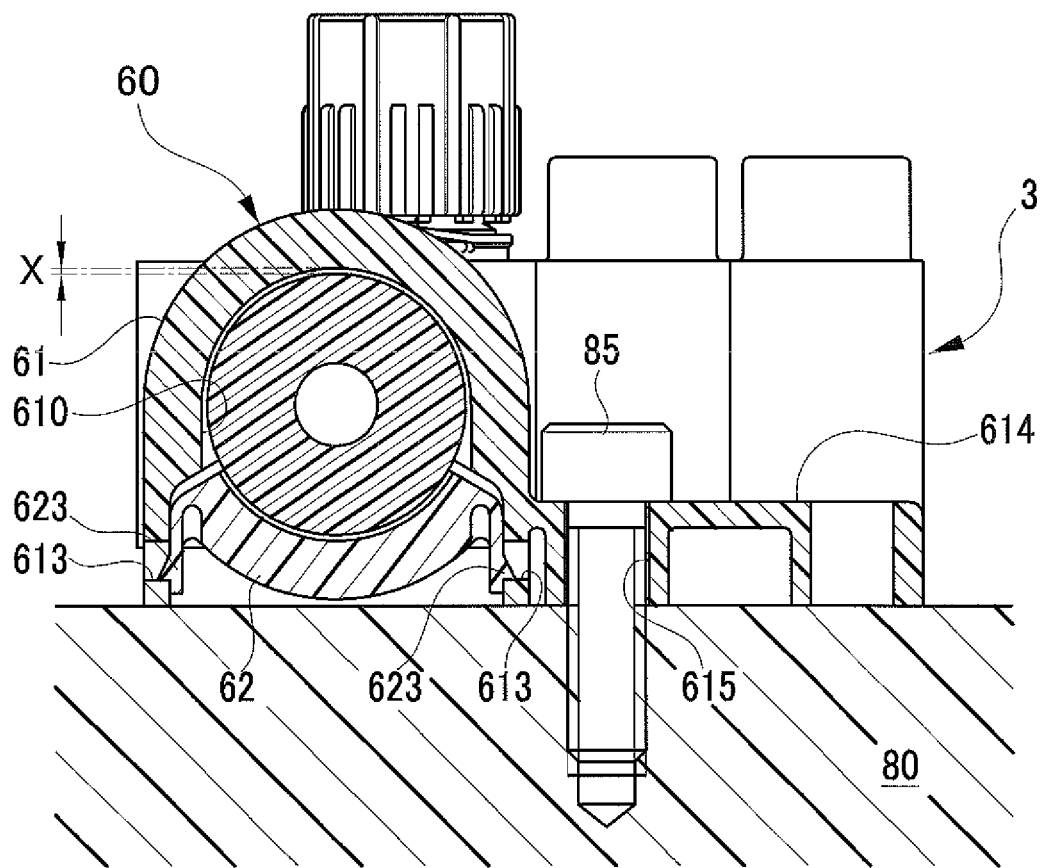
FIG. 3 is a B-B cross section view of the fluid control device manifold shown in FIG. 1 in the first embodiment.

FIG. 3 is a B-B cross section of the fluid control device manifold 1 shown in FIG. 1 in the first embodiment. FIG. 13 is an exploded view corresponding to an F-F cross section view of the assembling procedure (a fourth step) shown in FIG. 12 in the first embodiment. The clamp 60 shown in FIG. 3 is a member for holding a state of the first connection part 4 of the first body 2 and the second connection part 5 of the second body 3, each of which is press-fitted in the seal member 6.

As shown in FIG. 13, the clamp 60 consists of a first clamp member 61 and a second clamp member 62.

A holding part 611 is formed with a fan-like first holding groove 612. A side surface 617 of the first holding groove 612 has a planar shape which will be placed in parallel with the first connection-part holding surface 4f of the connection part 4 completely press-fitted in the seal member 6 to hold the holding surface 4f.

Further, as with the first clamp member 61, the second clamp member 62 is also internally formed with a fan-like second holding groove 622 and a holding side surface 627. When the first clamp member 61 and the second clamp member 62 are engaged, a holding groove 610 is formed to make the first holding groove 612 and the second holding groove 622 cover and hold the connection parts 4 and 5 completely press-fitted in the seal member 6.

The diameter of the holding groove 610 formed by the first and second holding grooves 612 and 622 is slightly larger than the diameter of the connection part 4. Thus, when the connection parts are held by the holding groove 610, as shown in FIG. 3, a gap X is generated between the holding groove 610 and the connection part 4.

The first holding groove 612 is formed to engage with the connection parts 4 and 5 over a range exceeding one-half of the entire circumference as shown in FIG. 3. In the present embodiment, concretely, the first holding groove 612 is formed to engage with a portion of the connection part exceeding two-thirds of the entire circumference. Accordingly, while only the first clamp member 61 temporarily holds the connection part, the second clamp member 62 can be attached. Thus, good workability is achieved. Since the structural strength of the first clamp member 61 can be enhanced, thereby enabling preventing breakage of the clamp 60. The first clamp member 61 placed to cover the connection part from above has a large engagement area, so that it is less likely to disengage even when subjected to external impact or the like.

In the present embodiment, the first holding groove 612 engages with the portion beyond two-thirds of the entire circumference of the connection parts 4 and 5. As long as it engages with one-half portion or more, however, the same operation advantage as in the case of the engagement with the two-thirds portion or more can be achieved.

As shown in FIG. 13, at both ends of the holding part 611, fitting recesses 613 are formed to engage with fitting protruding portions 623 of the second clamp member 62. When the protruding portions 623 are engaged in the recesses 613, the first clamp member 61 and the second clamp member 62 can hold the connection parts 4 and 5 in a covered state.

As shown in FIG. 13, the first clamp member 61 includes a mounting part 614 for fixation to the fixed plate 80 in addition to the holding part 611 for holding the connection parts.

The mounting part 614 includes a contact surface 616 which will contact with the fixed plate 80 and screw holes 615 for fixation to the fixed plate. This mounting part 614 is a nearly rectangular parallelepiped block extending vertically from one end of the holding part 611. As shown in FIG. 3, the first clamp member 61 attached with the second clamp member 62 is fixed to the fixed plate 80 with a fixing screw 85 inserted in the screw hole 615. Thus, the second clamp member 62 is surrounded by the first clamp member 61, the first body 2, the second body 3, and the fixed plate 80, so that the second clamp member 62 is prevented from erroneously detaching from the first clamp member 61 by external force.

<Structure of Connecting Tool>

Figure 16:
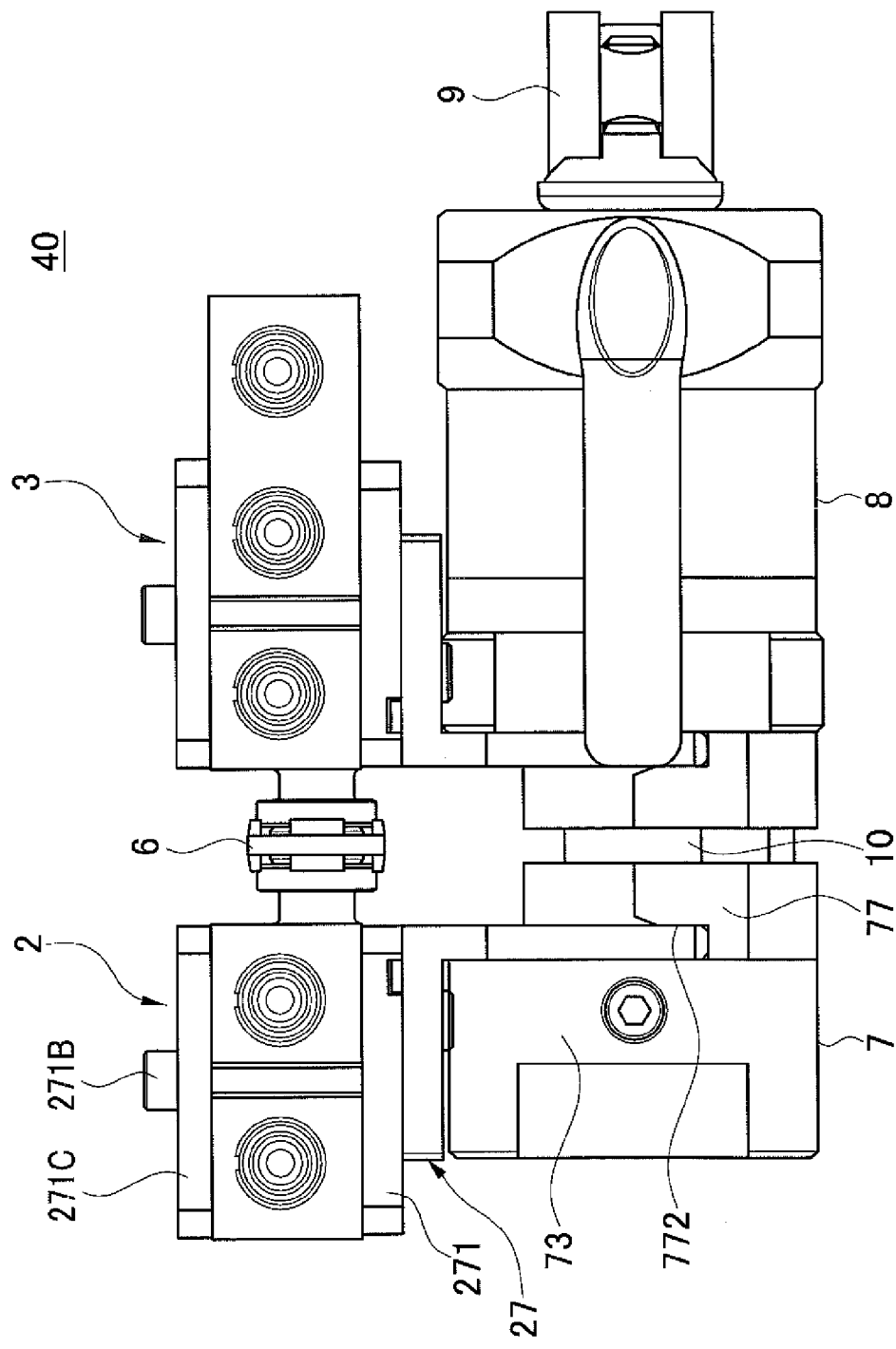
FIG. 16 is a front view of a connecting tool in the first embodiment.
Figure 17:
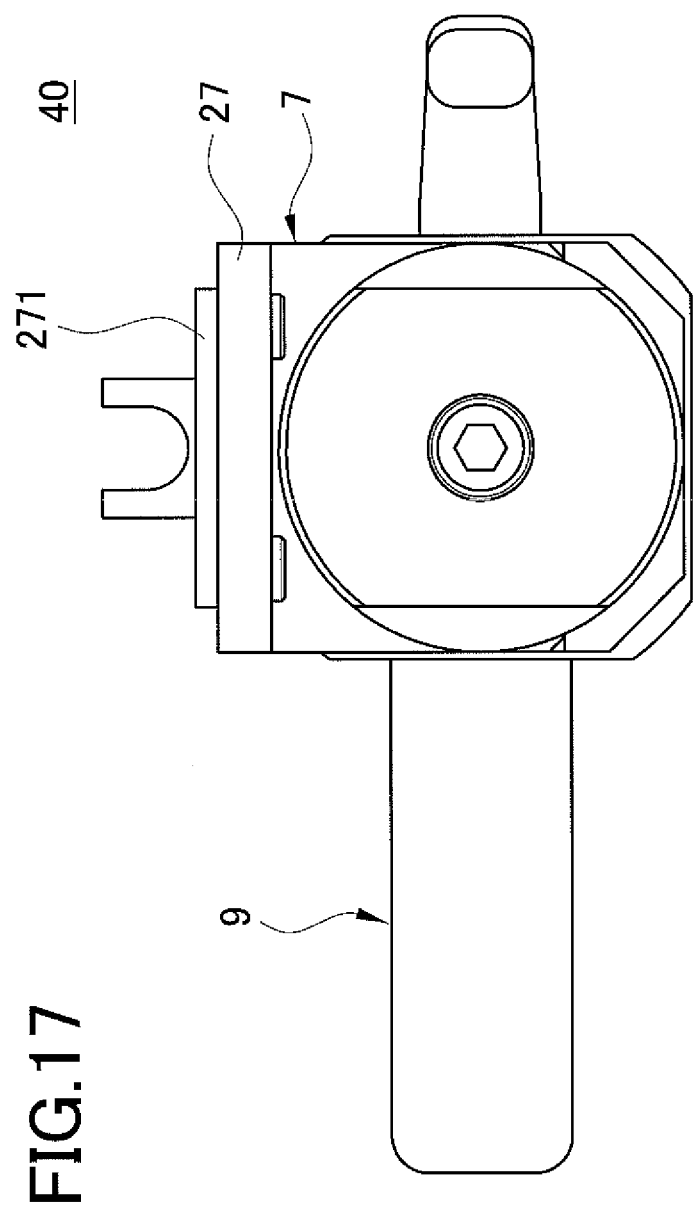
FIG. 17 is a left side view of the connecting tool in the first embodiment.
Figure 18:
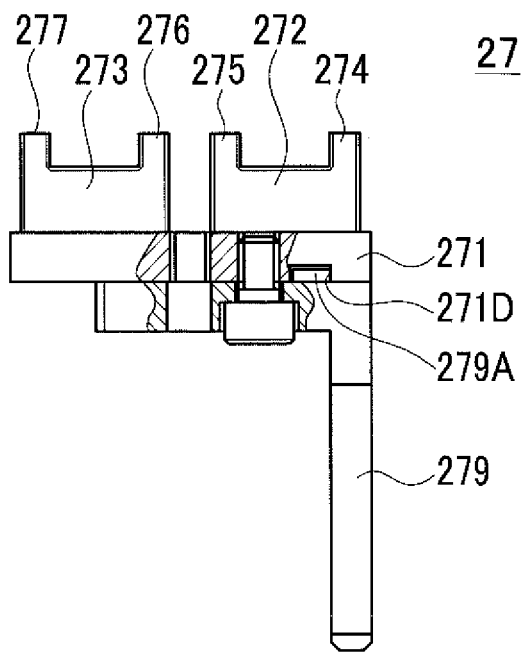
FIG. 18 is a front view of the first engagement part in the first embodiment.
Figure 19:
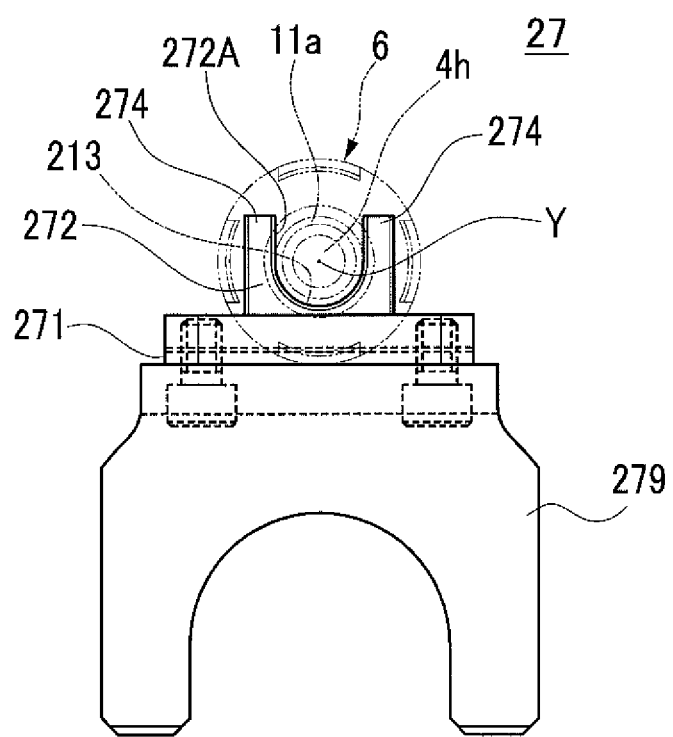
FIG. 19 is a right side view of the first engagement part in the first embodiment.
Figure 20:
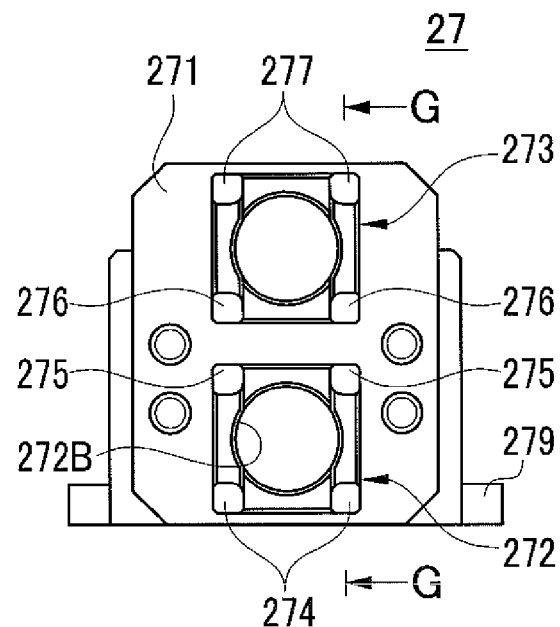
FIG. 20 is a top view of the first engagement part in the first embodiment.
Figure 21:
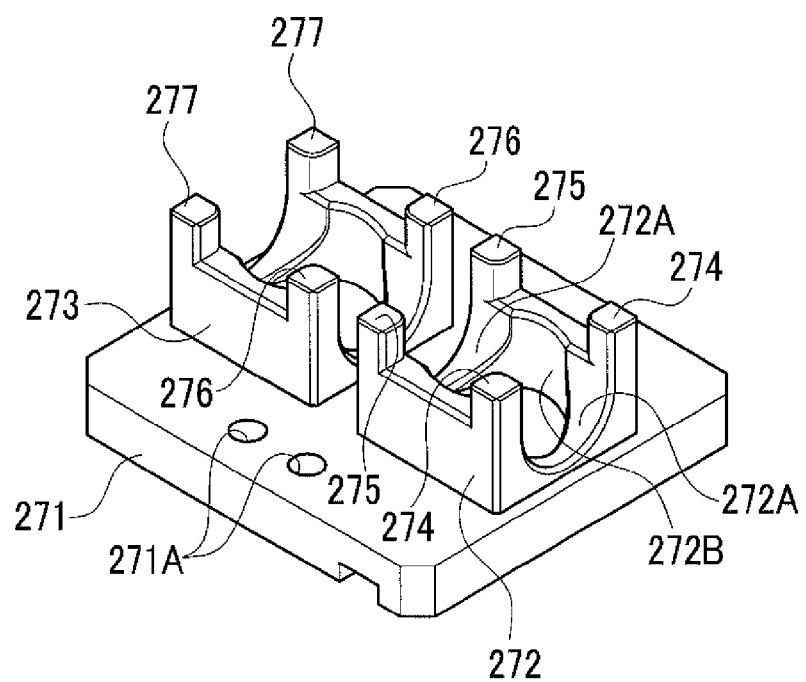
FIG. 21 is an external perspective view of the first engagement part in the first embodiment.
Figure 27:
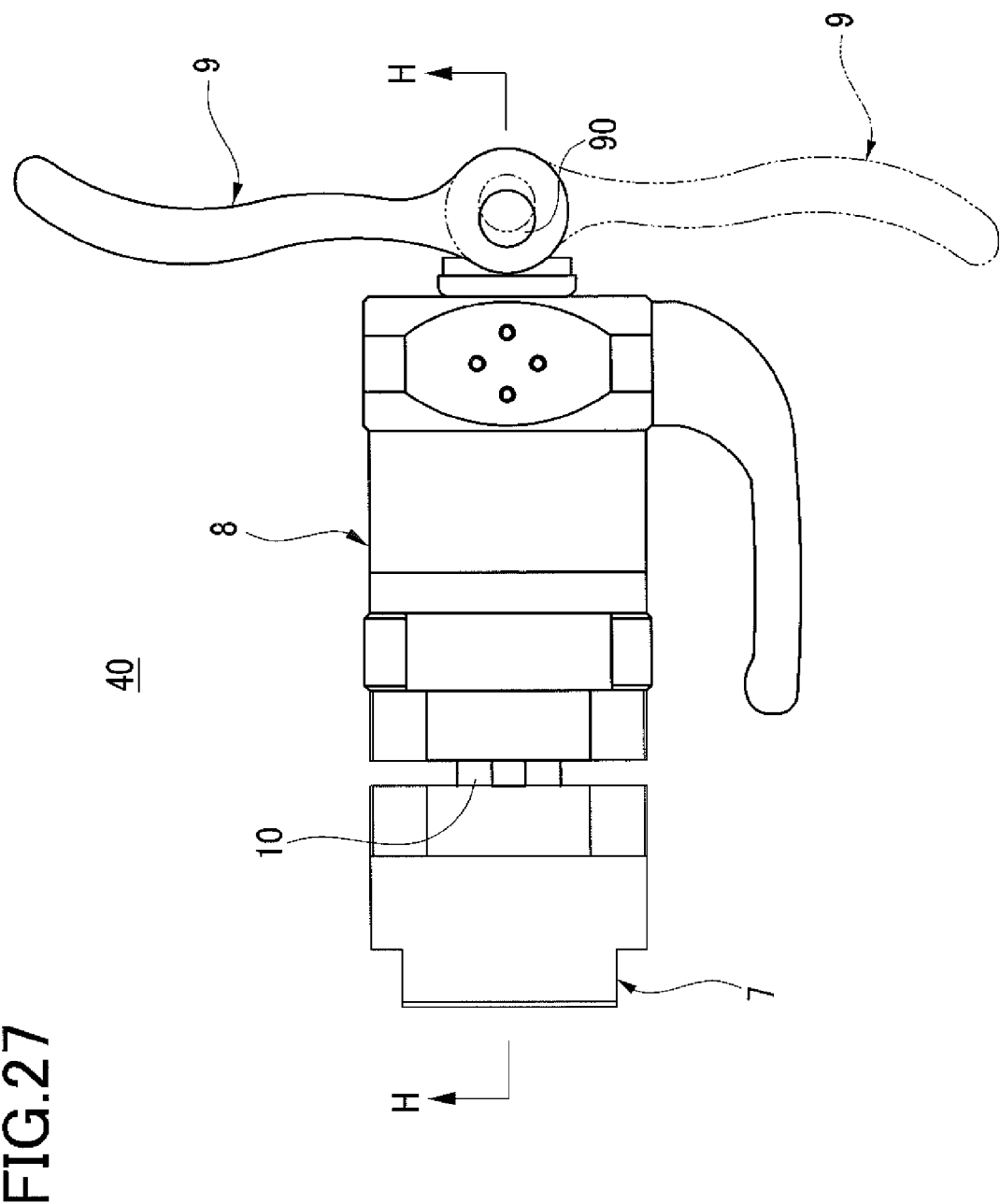
FIG. 27 is a lower view of the connecting tool in the first embodiment.
Figure 28:
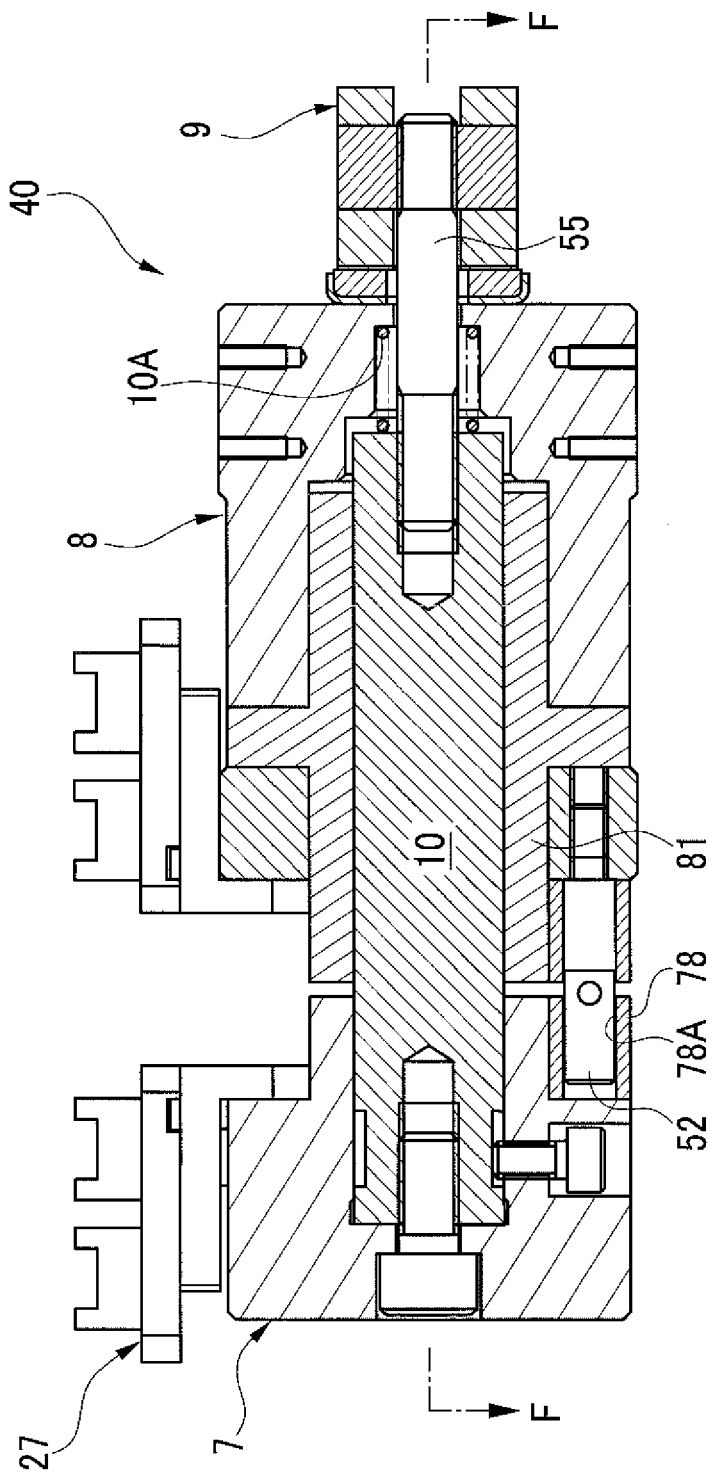
FIG. 28 is an H-H cross section view of the connecting tool shown in FIG. 27 in the first embodiment.
Figure 29:
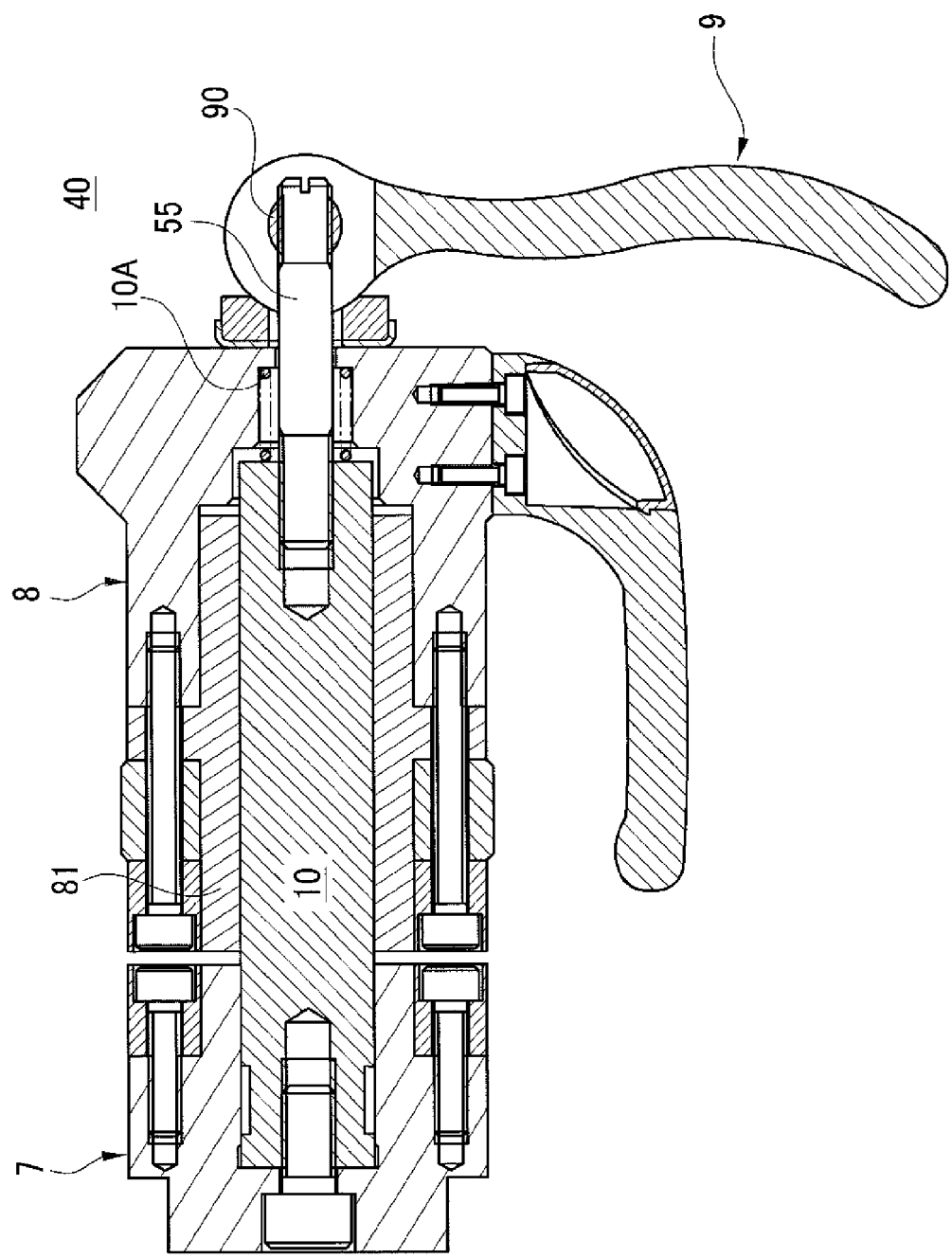
FIG. 29 is an F-F cross section view of the connecting tool shown in FIG. 28 in the first embodiment.

FIG. 16 is a front view of a connecting tool in the first embodiment. FIG. 17 is a left side view of the connecting tool in the first embodiment. FIG. 18 is a front view of a first engagement part in the first embodiment. FIG. 19 is a right side view of the first engagement part in the first embodiment. FIG. 20 is a top view of the first engagement part in the first embodiment. FIG. 21 is an external perspective view of the first engagement part in the first embodiment. FIG. 27 is a lower view of the connecting tool in the first embodiment. FIG. 28 is an H-H cross section view of the connecting tool shown in FIG. 27 in the first embodiment. FIG. 29 is an F-F cross section view of the connecting tool shown in FIG. 28 in the first embodiment.

As shown in FIG. 16, a connecting tool 40 includes a first engagement member 7, a second engagement member 8, and a cam member 9. The connecting tool 40 is a tool for press-fitting the first body 2 and the second body 3 into the seal member 6. The connecting tool 40 is made of metal having rigidity (stainless steel and others) to prevent deformation during transmission of power.

The cam member 9 shown in FIGS. 16 and 28 includes a lever part and is fixed to a fixed shaft 10 through a pivot shaft 90 and a coupling member 55, and further to the first engagement member 7 with a fixing screw. The cam member 9 constitutes a cam mechanism rotatable about the pivot shaft 90. As shown in FIGS. 28 and 29, between the cam member 9 and the first engagement member 7, there is placed a second engagement member 8 through a cylindrical bearing 81 for allowing sliding of the second engagement member 8 with respect to the fixed shaft 10 in an axial direction.

Furthermore, a cylindrical pin 52 fixed to the second engagement member 8 is guided along a bearing surface 78A of a bearing fixed to the first engagement member 7, so that the second engagement member 8 is allowed to move without rotating with respect to the first engagement member 7. The second engagement member 8 is pressed toward the cam member 9 by a spring 10A. As shown in FIG. 27, when the cam member 9 is moved to the position indicated by a broken line, the second engagement member 8 is slid to come close to the first engagement member 7.

(First Engagement Member)

The first engagement member 7 is configured as shown in FIG. 16 such that a first engagement part 27 is fixedly clamped between a fixing part 73 and a first fixing member 77.

The first fixing member 77 is formed as shown in FIG. 16 with an L-shaped contact portion 772 contacting with the first engagement part 27.

As shown in FIGS. 18 to 21, the first engagement part 27 includes a first mounting part 279 clamped between the fixing part 73 and the first fixing member 77, a first base plate 271, a first engagement block 272, and a second engagement block 273. The first base plate 271, the first engagement block 272, and the second engagement block 273 are made in one piece by machining. The first base plate 271 and the first mounting part 279 are fixed to each other with a bolt while a boss 279A is engaged in a groove 271D extending vertically to the drawing direction to receive a load. At that time, no load in the drawing direction acts on the bolt.

As shown in FIG. 21, the first engagement block 272 is formed with first engagement protruding portions 274 which will engage with the first screw holes 214 of the first operation part 21, and second engagement protruding portions 275 which will engage with the second screw holes 215 of the first operation part 21.

Furthermore, the first engagement block 272 is formed with first flow passage engagement portions 272A each having a cylindrical recessed shape corresponding to the flow passage wall 213 shown in FIG. 5.

As shown in FIG. 21, at the center of the first engagement block 272, a first bottom engagement portion 272B is formed in a cylindrical recessed shape in a perpendicular direction to the flow passage 4h.

As above, the recessed portions of the first operation part 21 of the first body 2 conform to the protruding shapes of the first engagement block 272, forming engagement surfaces in a mutual wide range.

To be concrete, as shown in FIG. 19, the first engagement protruding portions 274 are inserted and engaged in an upper portion beyond the center axis Y of the seal member 6 (corresponding to the center axis of the flow passage 4h) and can transmit the pressing force.

The shape of the second engagement block 273 is the same as that of the first engagement block 272 and the detailed explanation thereof is omitted. Thus, the second engagement block 273 can provide the same operation advantage as the first engagement block 272.

Further, the first engagement member 7 is provided with a dropout prevention plate 271C. The first body 2 is sandwiched between the dropout prevention plate 271C and the first base plate 271 with a bolt 271B screwed in a bolt mounting hole 271A. This makes it possible to prevent the first body 2 from dropping or falling out during press-fitting work and avoiding insufficient engagement.

(Second Engagement Member)

The shape of the second engagement member 8 is not so largely different from the shape of the first engagement member 7 and therefore the details thereof are not explained herein. Thus, the second engagement member 8 can provide the same operation advantage as the first engagement member 7.

Consequently, each engagement protruding portion of the first engagement member 7 and the second engagement member 8 is inserted into and engaged with an upper portion of the first body 2 located above the center axis Y of the seal member 6 (corresponding to the center axis of the flow passage 4h) and reaches three-quarters of the entire circumference of the annular groove 11a of the seal member 6. Thus, almost the entire circumference of the annular groove 11a of the seal member 6 can be uniformly pressed.

<Method of Handling Connecting Tool>

The seal member 6 is temporarily inserted between the first body 2 and the second body 3. The first engagement block 272 and the second engagement block 273 of the first engagement member 7 are inserted and engaged in the first body 2 from the side of the first bottoms 218 of the first operation part 21 and the second operation part 22. The second engagement member 8 is engaged with the second body 3 (in the same manner as for the first body and thus omitted). The cam member 9 is rotated about the pivot shaft 90 to draw the first body 2 and the second body 3 close to each other, thereby press-fitting the seal member 6 therein.

Since a cam mechanism using the cam member 9 is employed, delicate positional adjustment between the first engagement member 7 and the second engagement member 8 can be achieved by an angle of a lever part. Accordingly, it is possible to press-fit the first body 2 and the second body 3 in the seal member 6 without applying a force beyond necessity and without breaking them.

Employing the cam mechanism using the cam member 9, the connecting tool 40 can convert rotary motion to rectilinear motion and multiply the power thereof. Thus, even a small force on the lever part can generate a large press-fitting force.

The connecting tool 40 can be operated by one action of changing the positon of the cam member 9 from an unclamped position indicated by a solid line in FIG. 27 to a clamped position indicated by a broken line in FIG. 27. This action only takes a short time, resulting in improved workability.

<Assembling Process of Fluid Control Device Manifold>

An assembling process of the fluid control device manifold 1 will be explained below. This manifold assembling process includes the following five steps.

Figure 9:
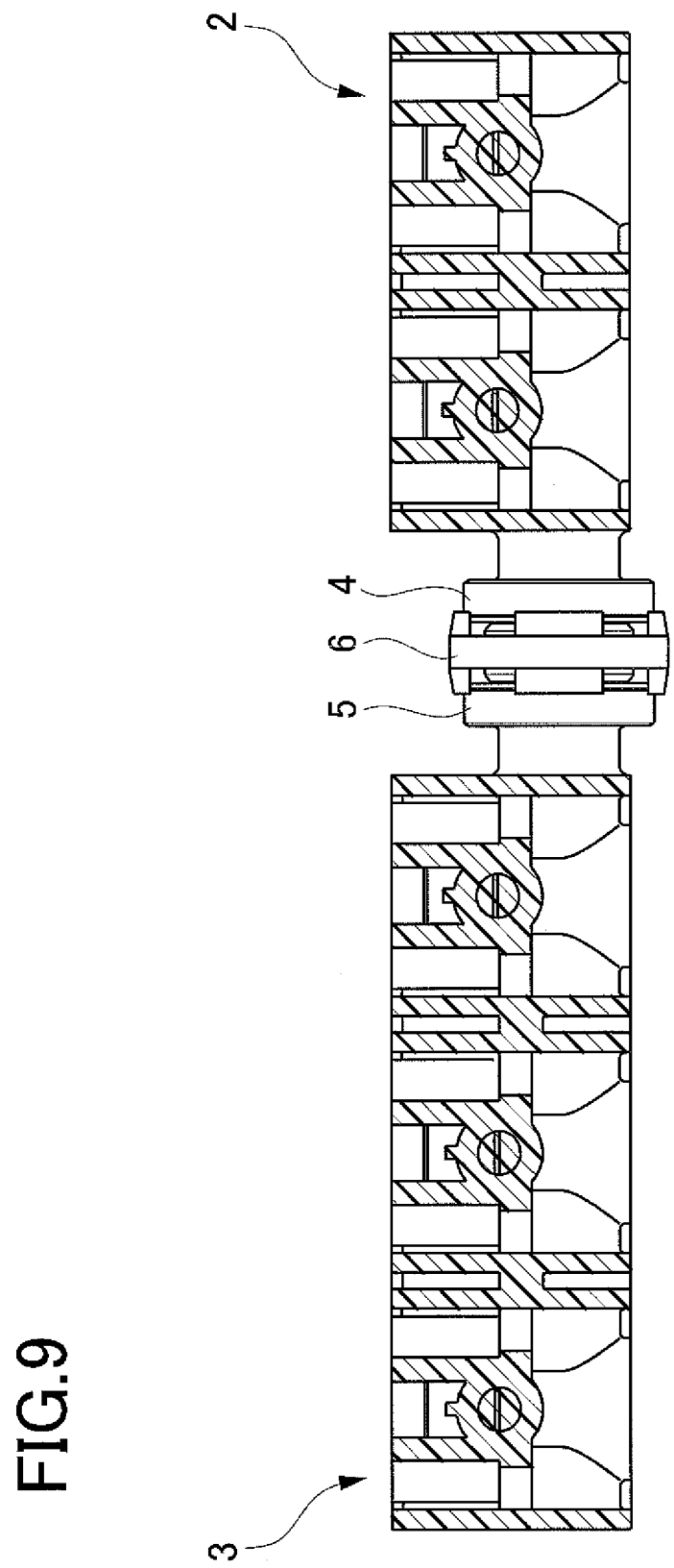
FIG. 9 is a diagram showing a procedure (the first step) for assembling a second body and the seal member shown in FIG. 10 in the first embodiment.
Figure 10:
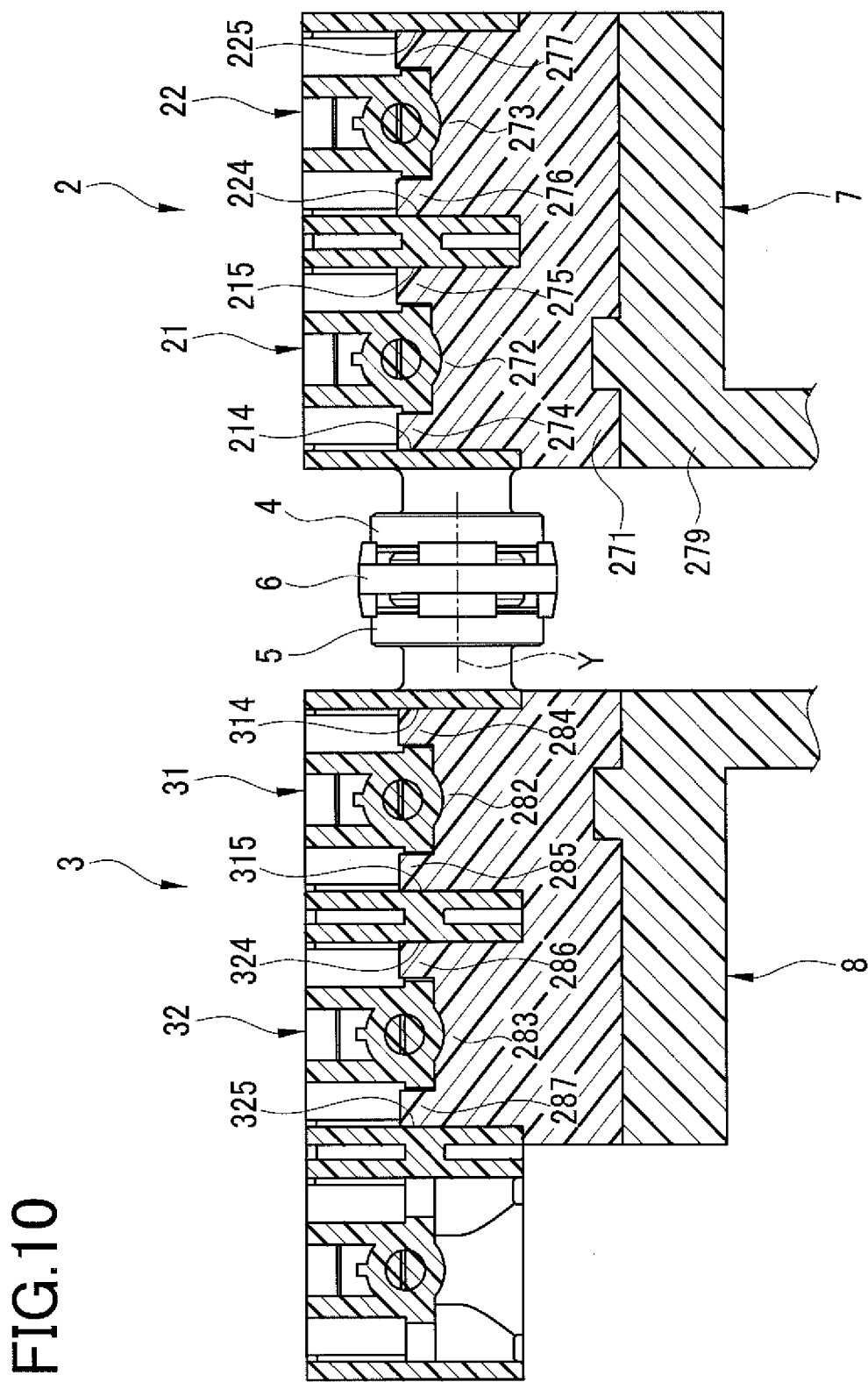
FIG. 10 is a diagram showing the assembling procedure (a second step) including a D-D cross section view of the first body of FIG. 5 and the second body, and a G-G cross section view of a first engagement part shown in FIG. 20 in the first embodiment.
Figure 11:
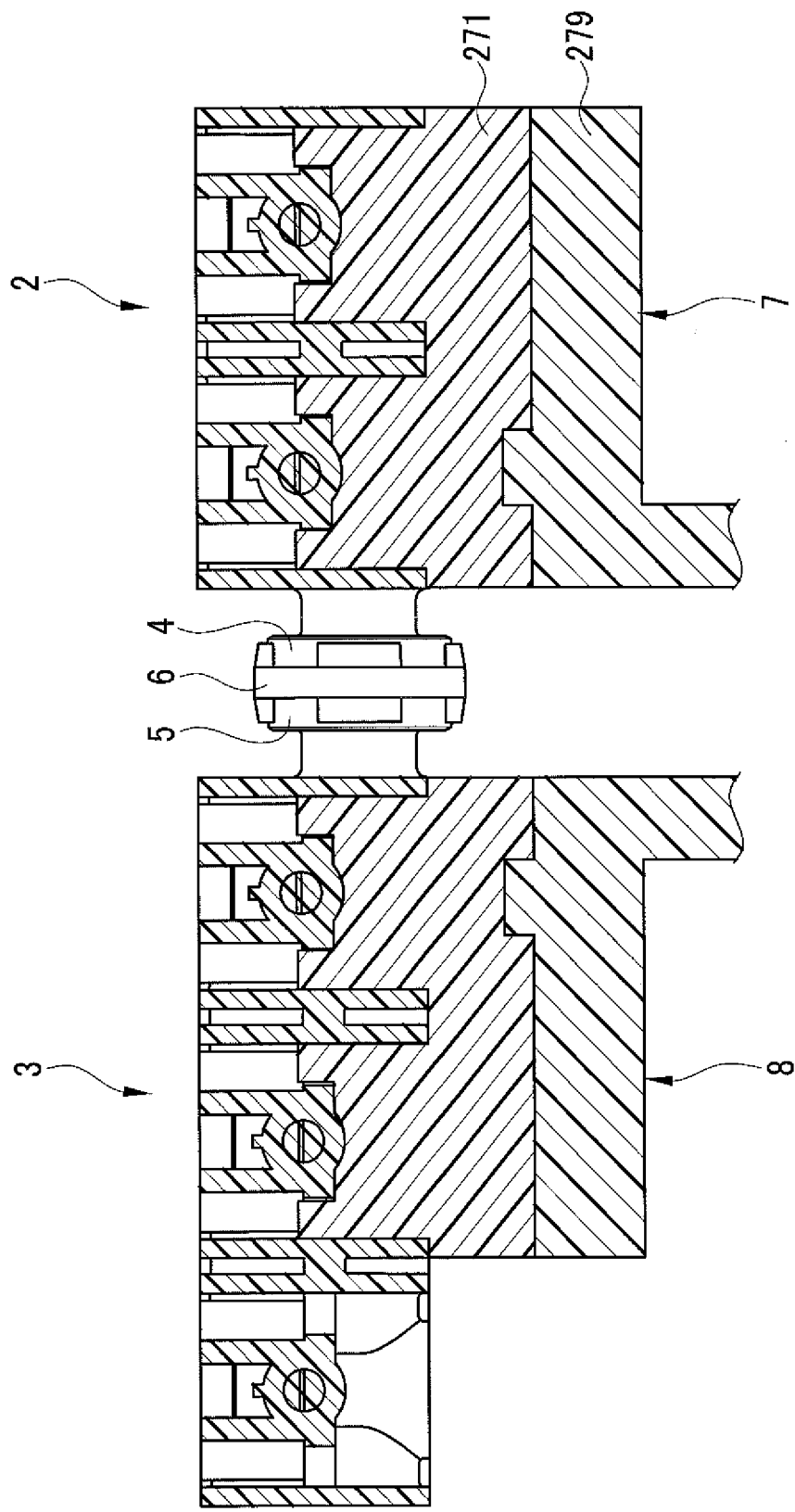
FIG. 11 is a diagram showing the assembling procedure (a third step) including the D-D cross section view of the first body of FIG. 5 and the second body, and the G-G cross section view of the first engagement part shown in FIG. 20 in the first embodiment.
Figure 12:
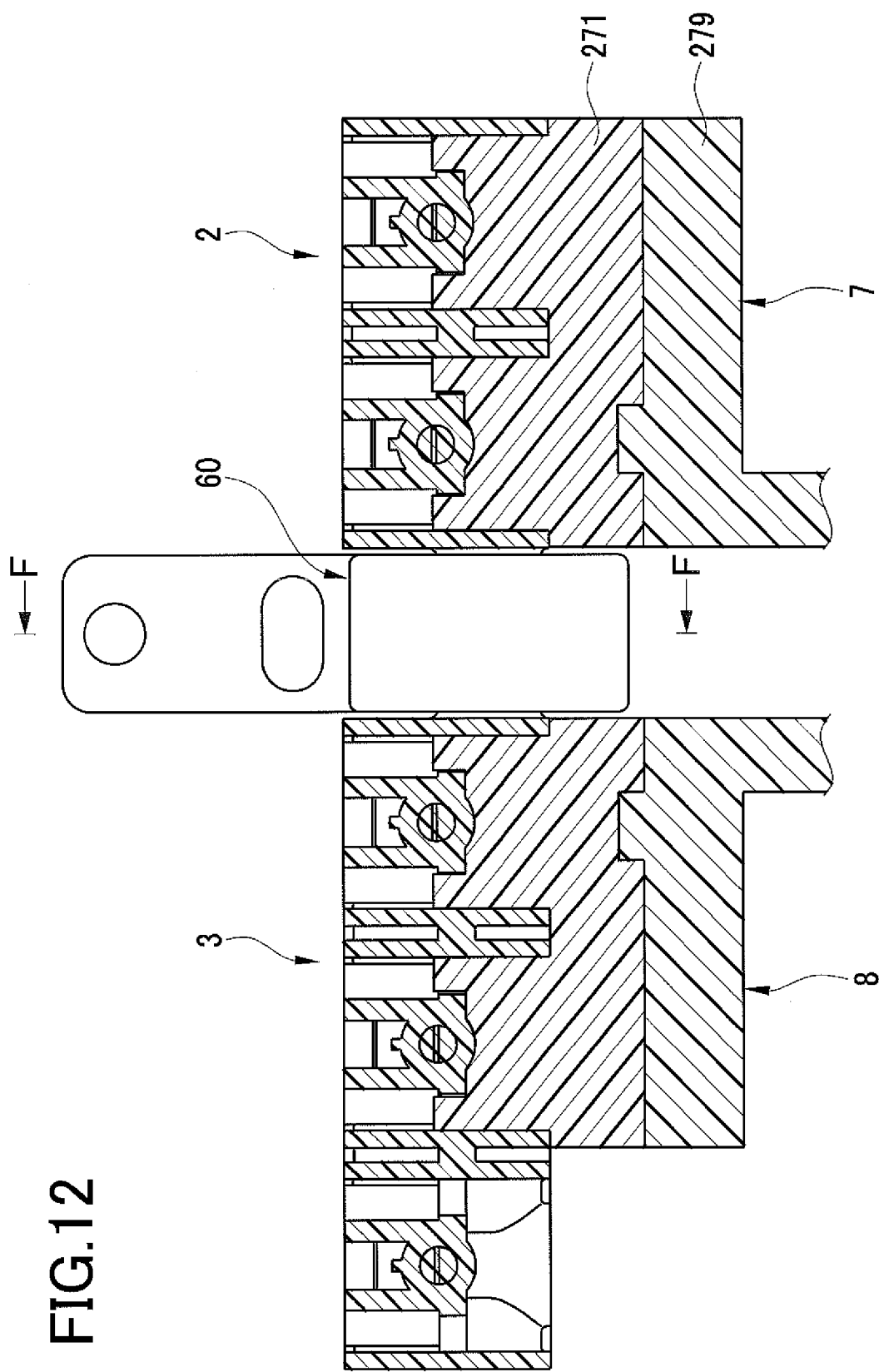
FIG. 12 is a diagram showing the assembling procedure (a fourth step) including the D-D cross section view of the first body of FIG. 5 and the second body, and the G-G cross section view of the first engagement part shown in FIG. 20 in the first embodiment.
Figure 13:
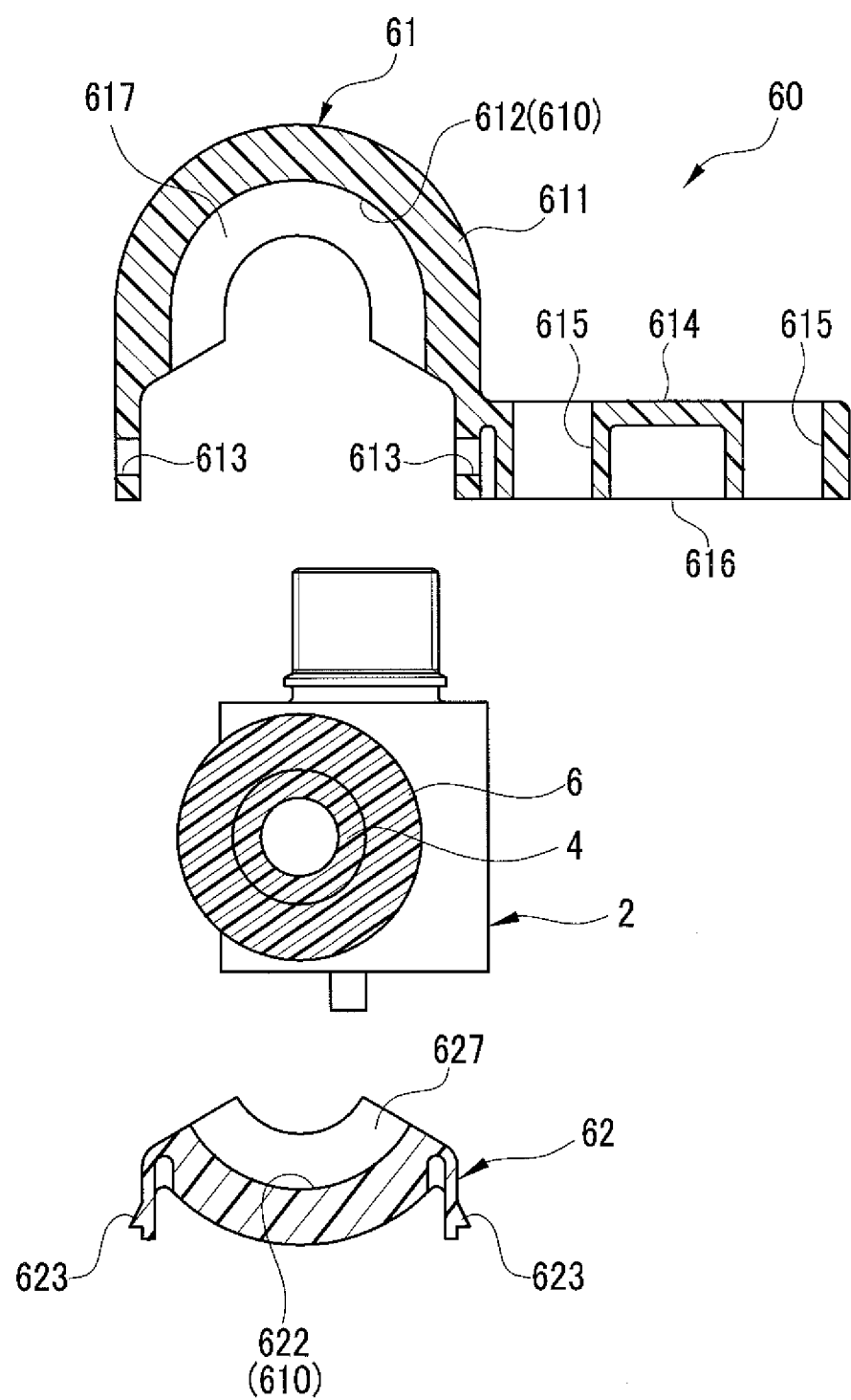
FIG. 13 is an exploded view corresponding to a F-F cross section view of the assembling procedure (the fourth step) shown in FIG. 12 in the first embodiment.

The manifold assembling steps (1) to (5) in the first embodiment are shown in cross section views in FIGS. 8 to 12. In FIGS. 10 to 12, only parts of the first engagement member 7 and the second engagement member 8 of the connecting tool 40 are shown for convenience of explanation.

(1) A first step is a step of temporarily inserting the first body 2 and the second body 3 in the seal member 6 by hands.

FIG. 8 is a diagram showing a procedure (the first step) for assembling the first body 2 and the seal member 6 shown in FIG. 10 in the first embodiment. FIG. 9 is a diagram showing a procedure (the first step) for assembling the second body 3 and the seal member 6 shown in FIG. 10 in the first embodiment. As shown in FIG. 8, the seal member 6 is inserted in the first connection part 4. At that time, the annular projection 4b of the first connection part 4 is engaged in the guide portion 11e of the seal member 6 so that protruding portion 4g of the first connection part 4 engages with the hook portions 12a of the seal member 6. Successively, the second connection part 5 and the seal member 6 are similarly engaged with each other as shown in FIG. 9.

(2) A second step is a step of attaching the connecting tool 40 to the first body 2 and the second body 3.

As shown in FIG. 10, the first engagement protruding portions 274 of the first engagement block 272 are inserted in the first screw holes 214 of the first operation part 21, while the second engagement protruding portions 275 are inserted in the second screw holes 215. Further, the first engagement protruding portions 276 of the second engagement block 273 are inserted in the first screw holes 224 of the second operation part 22, while the second engagement protruding portions 277 are inserted in the second screw holes 225.

Similarly, the first engagement protruding portions 284 of the first engagement block 282 are inserted in the first screw holes 314 of the first operation part 31, while the second engagement protruding portions 285 are inserted in the second screw holes 315. Further, the first engagement protruding portions 286 of the second engagement block 283 are inserted in the first screw holes 324 of the second operation part 32, while the second engagement protruding portions 287 are inserted in the second screw holes 325.

As shown in FIG. 10, the first engagement block 272 and the second engagement block 273 of the connecting tool 40 can enter into the first body 2 and the second body 3 more deeply than the center axis Y of the seal member 6 (corresponding to the center axis of the flow passage 4h). To be concrete, as shown in FIGS. 10 and 19, the first and second engagement protruding portions 274, 275, 276, 277, 284, 285, 286, and 287 are inserted to positions located above the center axis Y of the seal member 6 (corresponding to the center axis of the flow passage 4h). The positions reach the three-quarters of the entire circumference of the annular groove 11a of the seal member 6.

(3) A third step is a step of press-fitting the connection part 4 of the first body 2 and the connection part 5 of the second body 3 into the seal member 6 by use of the connecting tool 40.

The cam member 9 is moved 180° from the position shown in FIGS. 16 and 17. Thus, the second engagement member 8 is pushed by the cam member 9 to move toward the first engagement member 7. Accordingly, the second engagement member 8 slides along the fixed shaft 10 toward the first engagement member 7, thus coming close to the first engagement member 7.

When the first engagement member 7 and the second engagement member 8 are drawn close to each other, the first body 2 and the second body 3 are made to come close to each other. Thus, the first engagement member 7 and the second engagement member 8 are moved from the state shown in FIG. 10 to the state shown in FIG. 11, thereby press-fitting the first connection part 4 of the first body 2 and the second connection part 5 of the second body 3 into the seal member 6.

As shown in FIG. 10, the first engagement block 272 and the second engagement block 273 of the connecting tool 40 can enter more deeply than the center axis Y of the seal member 6. As shown in FIG. 19, furthermore, the first engagement protruding portions 274 are inserted to positions above the center axis Y of the seal member 6. In addition, the first engagement protruding portions 276, the second engagement protruding portions 275, 277, and others are also inserted deeply. Accordingly, about three-fourths of the entire circumference of the annular groove 11a and 11b serving as the press-fitting part of the seal member 6 can be included in the range that the engagement surfaces of the first engagement block 272 and the second engagement block 273 face each other. This can uniform pressing over the entire circumference of the annular grooves 11a and 11b of the seal member 6. Accordingly, it is possible to prevent the seal member 6 from press-fitting in the connection parts on a slant. Sealing can thus be ensured.

The above engagement of about three-fourths of the entire circumference enables reliable transmission of the drawing load of the first engagement member 7 and the second engagement member 8.

The above engagement of about three-fourths of the entire circumference enables avoiding misalignment of the center axis of the first connection part 4 and the center axis of the second connection part 5. Therefore, it is possible to constantly apply a force uniformly over the entire circumference of the internal surfaces of the connection parts 4 and 5.

Further, because of the above engagement of about three-fourths of the entire circumference, the force can uniformly act on almost the entire circumference. Accordingly, the first body 2 and the second body 3 can be drawn to each other while keeping their contact parts in parallel relation, so that the force can be applied uniformly to the entire circumference of the annular grooves 11a and 11b of the seal member 6. This enables achieving reliable press-fit sealing.

The first engagement member 7 and the second engagement member 8 are moved along the fixed shaft 10 and thus can be stably shifted in parallel. Such stable parallel shift enables parallel drawing the first engagement member 7 and the second engagement member 8, thus applying the force uniformly over the entire circumference of the annular grooves 11a and 11b of the seal member 6.

Further, since uniform application of the force to the entire circumference of the internal surfaces of the connection parts 4 and 5 can be achieved, this can result in applying a force needed to press-fit the annular projections 4b and 5b (see FIG. 14) of the connection parts 4 and 5 into the press-fit allowances 11c and 11d of the annular grooves 11b and 11a of the seal member 6.

The first engagement member 7 includes the first engagement protruding portions 274 and 276 and the second engagement protruding portions 275 and 277 and thus can engage with engagement holes (screw holes) located at eight places in the first body 2. Similarly, the second engagement member 8 includes the first engagement protruding portions 284 and 286 and the second engagement protruding portions 285 and 287 and thus can engage with engagement holes (screw holes) located at eight places in the second body 3.

Accordingly, it is possible to design the engagement parts with wide area and thus reduce stress or distortion caused in the engagement parts. The operation can be reliably performed without causing the first engagement member 7 and the second engagement member 8 to respectively drop off, or detach, from the first body 2 and the second body 3 during operation.

(4) A fourth step is to place the clamp 60 to cover the first connection part 4 and the second connection part 5, while the first body 2 and the second body 3 are press-fitted in the seal member 6 as shown in FIG. 13. To be concrete, the first clamp member 61 is put from above in FIG. 13, and then the second clamp member 62 is put from below in FIG. 13 to engage with the first clamp member 61. As shown in FIG. 3, both ends of the holding part 611 are formed with the fitting recesses 613 engageable with the fitting protruding portions 623 of the second clamp member 62. When the clamp 60 covers the connection parts in FIG. 11, a state shown in FIG. 12 appears.

Thereafter, the connecting tool 40 is detached from the first body 2 and the second body 3. The fourth step is thus terminated.

After the above steps, the connecting process of the first body 2 and the second body 3 is terminated.

(5) A fifth step is a step, after clamping the connection parts, to assemble the valve element and the drive section 2N required for fluid control, the bottom plate 2M, and others to the first body 2 and the second body 3 as shown in FIGS. 1 and 2.

As shown in FIGS. 1 and 2, since necessary components are mounted after assembling of the first body 2 and the second body 3, the engagement surfaces which will be invisible externally after assembling can be utilized in assembling. For instance, the first screw holes 214 and 224 and the second screw holes 215 and 225 and others are used as screw holes in which screws are inserted to secure the first operation part 21 and the second operation part 22. Since inserting the screws and others is performed after the assembling, the first screw holes 214 and 224 and the second screw hole 215 and 225 can be used in the assembling.

After the above steps, the assembling procedure of the fluid control device manifold is terminated.

<Fixation of Fluid Control Device Manifold>

The following explanation is given to the fluid control device manifold according to the present invention fixed to the fixed plate 80 with the fixing screw 85.

As shown in FIG. 1, the fluid control device manifold 1 can be fixed to the fixed plate 80 with the fixing screw 85.

Figure 14:
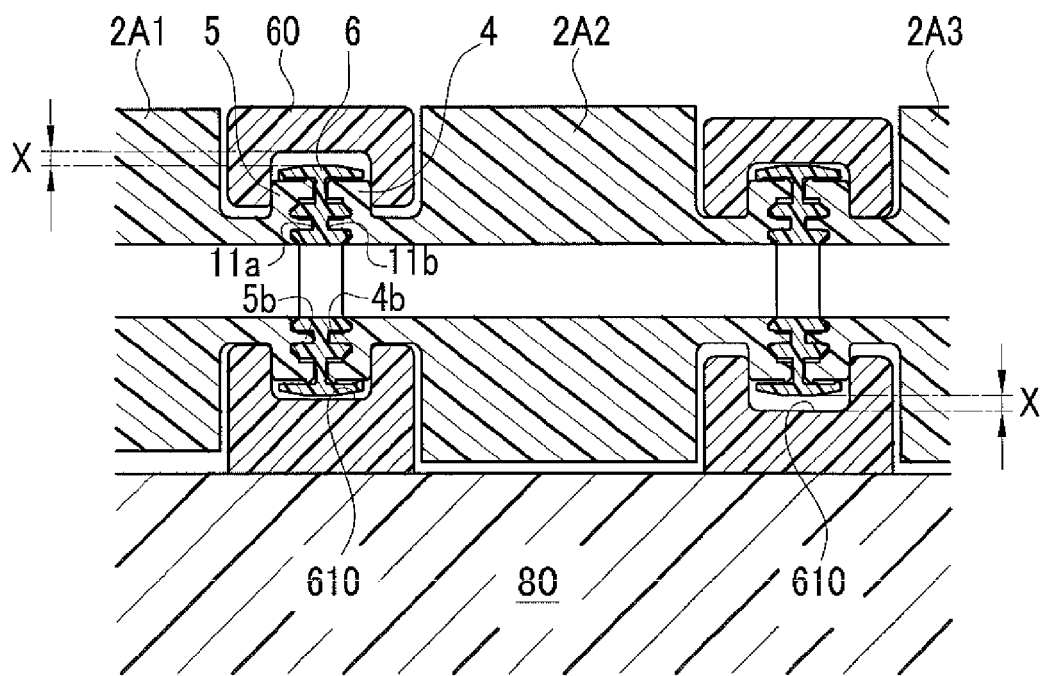
FIG. 14 is a cross section view of a connection part in the fluid control device manifold fixed to a fixed plate in the first embodiment.
Figure 15:
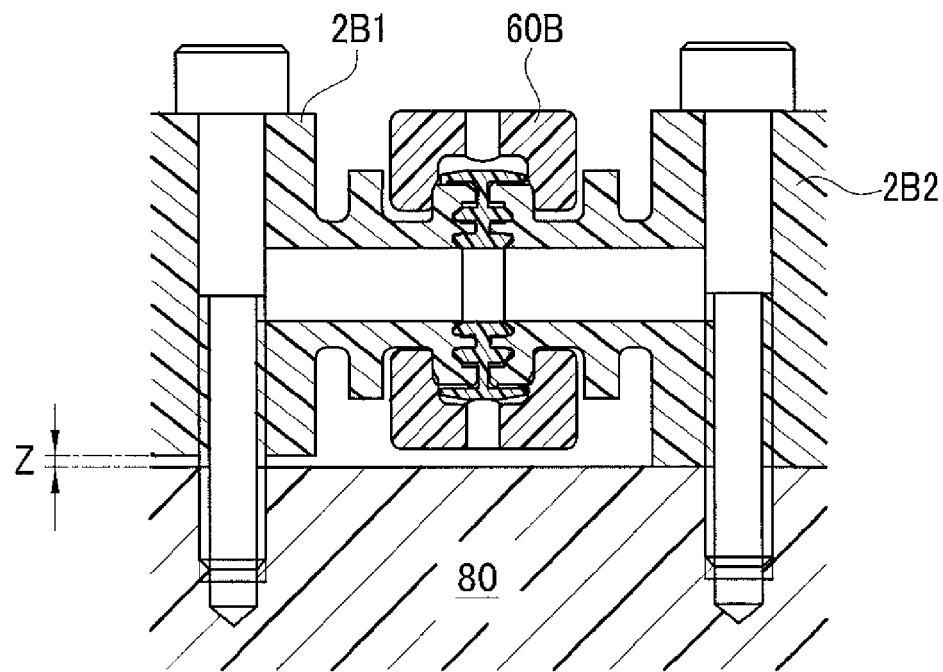
FIG. 15 is a cross section view of a fluid control device manifold fixed to a fixed plate in a conventional art.

FIG. 14 is a cross section view of the connection parts of the fluid control device manifold fixed to the fixed plate in the first embodiment. As shown in FIG. 14, on the inner side of the holding part 611, a gap X is generated between the holding groove 610 and the connection parts held therein. The gap X is used to absorb differences in the distance from the fixed plate 80 to each set of the connection parts and the clamp 60 when a plurality of bodies 2A1, 2A2, and 2A3 are connected to each other.

Specifically, even when there are differences in size between the bodies 2A1 2A2, and 2A3, differences in position between the connection parts, and differences in size between the clamps 60, those differences are absorbed by the clamps 60 fixed to the fixed plate 80, so that unnecessary external force is not applied to the connection parts and the main parts of the fluid control device manifold 1 and thus any seal failures and damages can be avoided.

Modified Example

The present invention is not limited to the above embodiment and may be variously embodied in other specific forms without departing from the essential characteristics thereof.

For instance, in the manifold assembling method, other components not involved in covering the engagement surfaces may be assembled before the seal member is press-fitted. Another alternative is to assemble those other components before fixing the manifold to the fixed plate or after fixing the manifold to the fixed plate.

For instance, in a case where the bodies have no valve seats, they may be similarly configured for the same fluid control function.

For example, the second clamp member 62 may be fastened with a screw to the first clamp member 61.

For instance, in a case where the bodies have no valve seat, the partition wall surfaces may be provided between the bodies similarly configured for the same fluid control function.

For instance, the range of the engagement surfaces nearly perpendicular to the center axis of the seal member may be placed on both sides, upper and lower, right and left, with respect to the center axis of the seal member.

For instance, the engagement surfaces are not limited to the cutouts and may be surfaces provided for the purpose of function.

For instance, the engagement surfaces provided in the screw holes may be provided for only one screw in each body, for two screws, or for all screws. As another alternative, the screw holes may be formed to extend across the partition wall surfaces.

For instance, the engagement surfaces may be two or more. The engagement surface(s) may be curved.

Although the example shows the first body and the second body almost the same in structure excepting the number of connected function parts, either one of the bodies may include a mounting groove of the conventional art. In this case, the connecting tool may have an engagement part on one side having a conventional mounting groove shape. Accordingly, there is no need to provide a mounting groove space in either one of the bodies, resulting in size reduction of the body.

For instance, the dropout prevention plate 271C of the connecting tool is not limited to a plate-like shape. This place 271C may be configured to be engageable with only the head of the bolt or may be fixed by a snap-fit claw. Further, as long as the body can be sufficiently engaged with the engagement member, the dropout prevention plate is not necessarily required. The dropout prevention plate 271C may also be formed integrally of a plate-like part and an engagement block part to engage with the shape of the body valve chamber, as with the first base plate 271.

Figure 22:
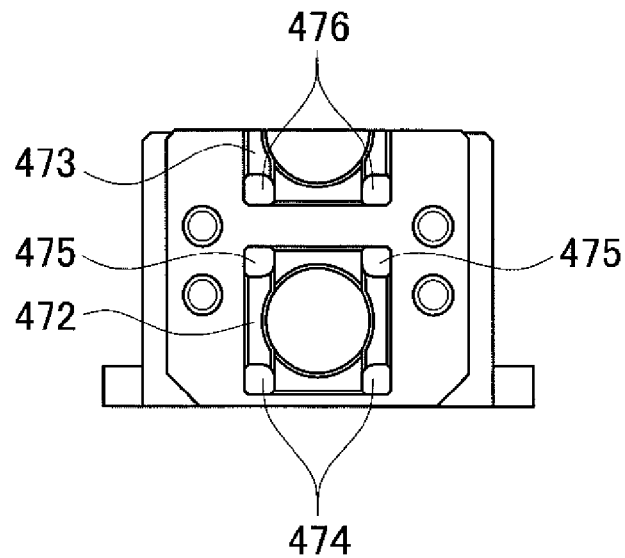
FIG. 22 is an external top view of a first engagement part of a modified example.

For instance, FIG. 22 is an external top view of a first engagement part of a modified example. As shown in FIG. 22, the engagement protruding portions may be arranged in three rows, i.e., first engagement protruding portions 474 and second engagement protruding portions 475 of a first engagement block 472 and first engagement protruding portions 476 of a second engagement block 473.

As an alternative, even though it is not shown, for example, the second engagement protruding portions 475 may be omitted and only the first engagement protruding portions 474 and the first engagement protruding portions 476 are arranged.

For instance, the second engagement protruding portions 475 may be configured as portions having only a guide function, not as the surface engageable with the engagement surface to directly press it. This is because the first engagement protruding portions 474 and the first engagement protruding portions 476 are portions that are engageable with the outer peripheral wall surface and the partition wall surface and thus impart a pressing force the most, so that even only the relevant portion formed as above can provide the same advantage.

Second Embodiment

Figure 30:
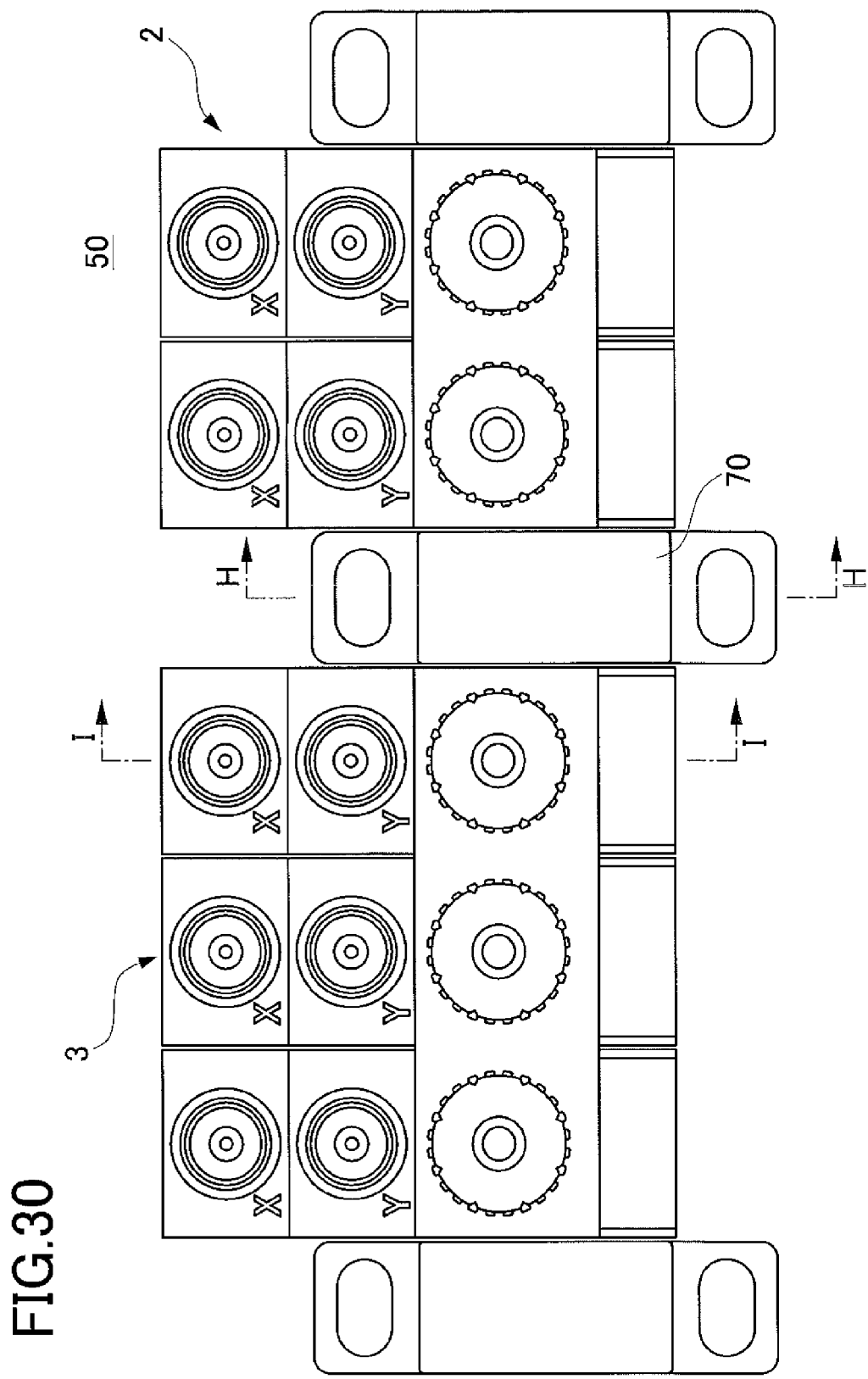
FIG. 30 is a front view of a fluid control device manifold in a second embodiment.
Figure 31:
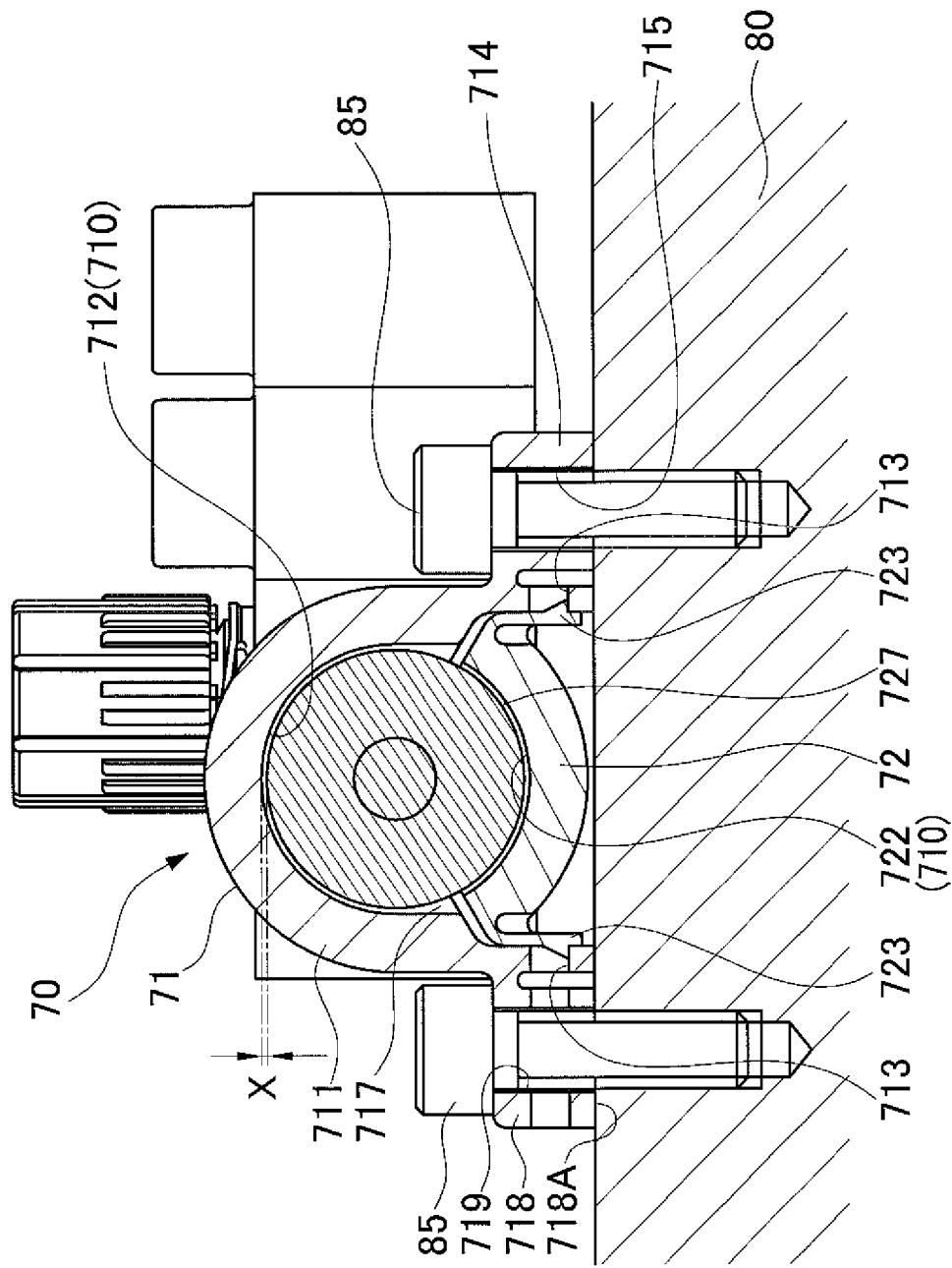
FIG. 31 is an H-H cross section view of the fluid control device manifold shown in FIG. 30 in the second embodiment.
Figure 32:
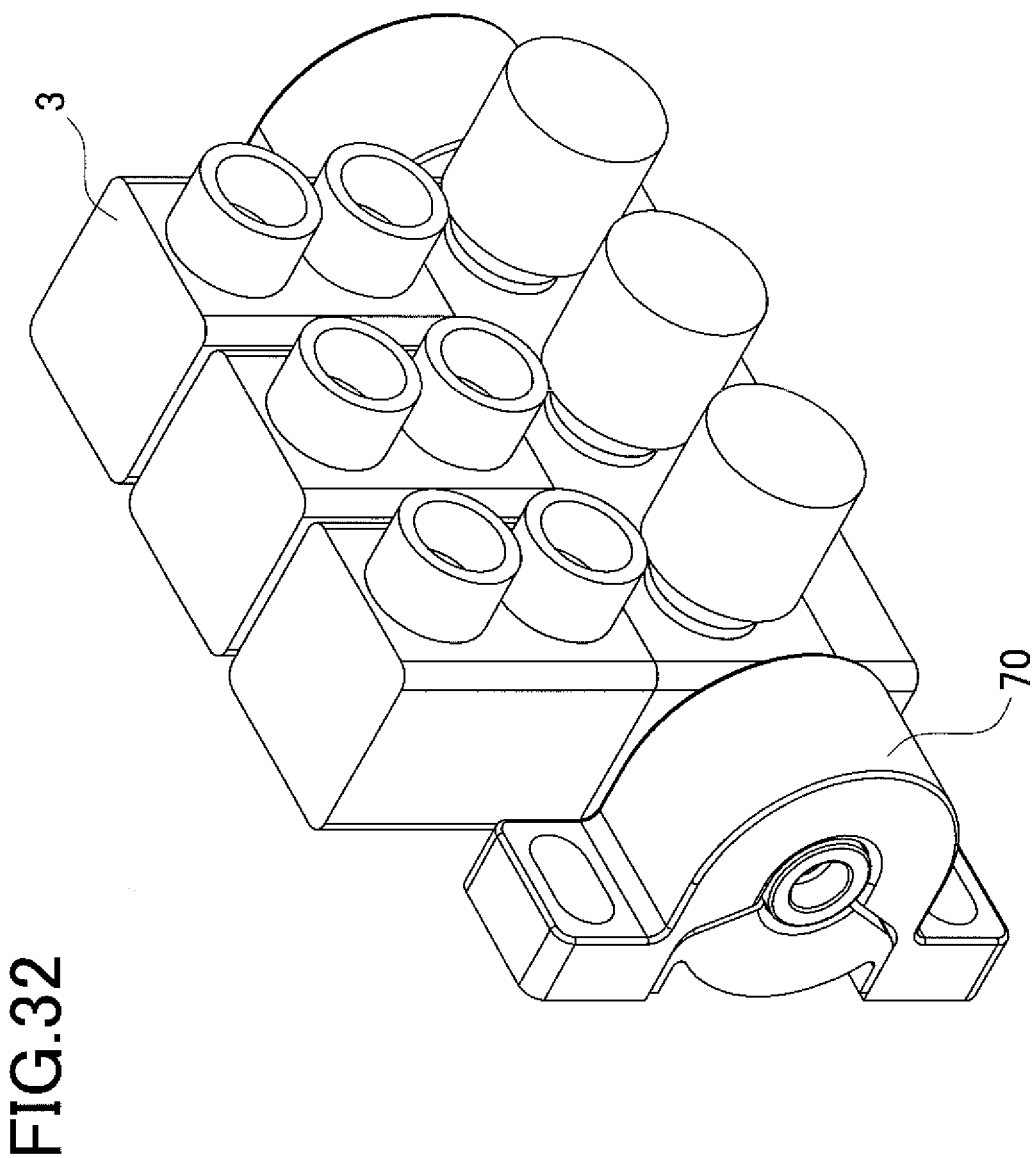
FIG. 32 is an external perspective front view of the fluid control device manifold (mounted on a wall) in the second embodiment.
Figure 33:
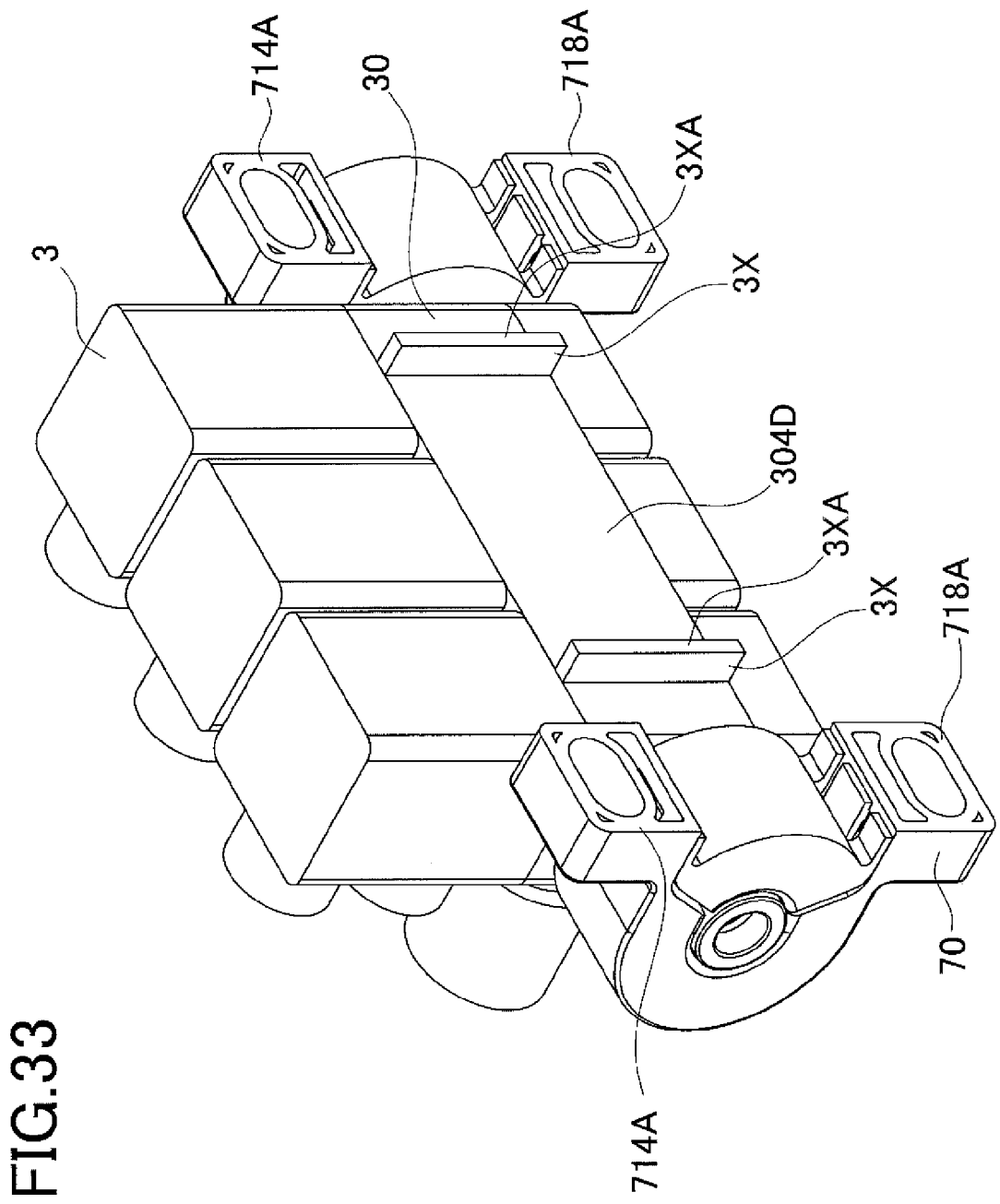
FIG. 33 is an external perspective back view of the fluid control device manifold (mounted on the wall) in the second embodiment.
Figure 34:
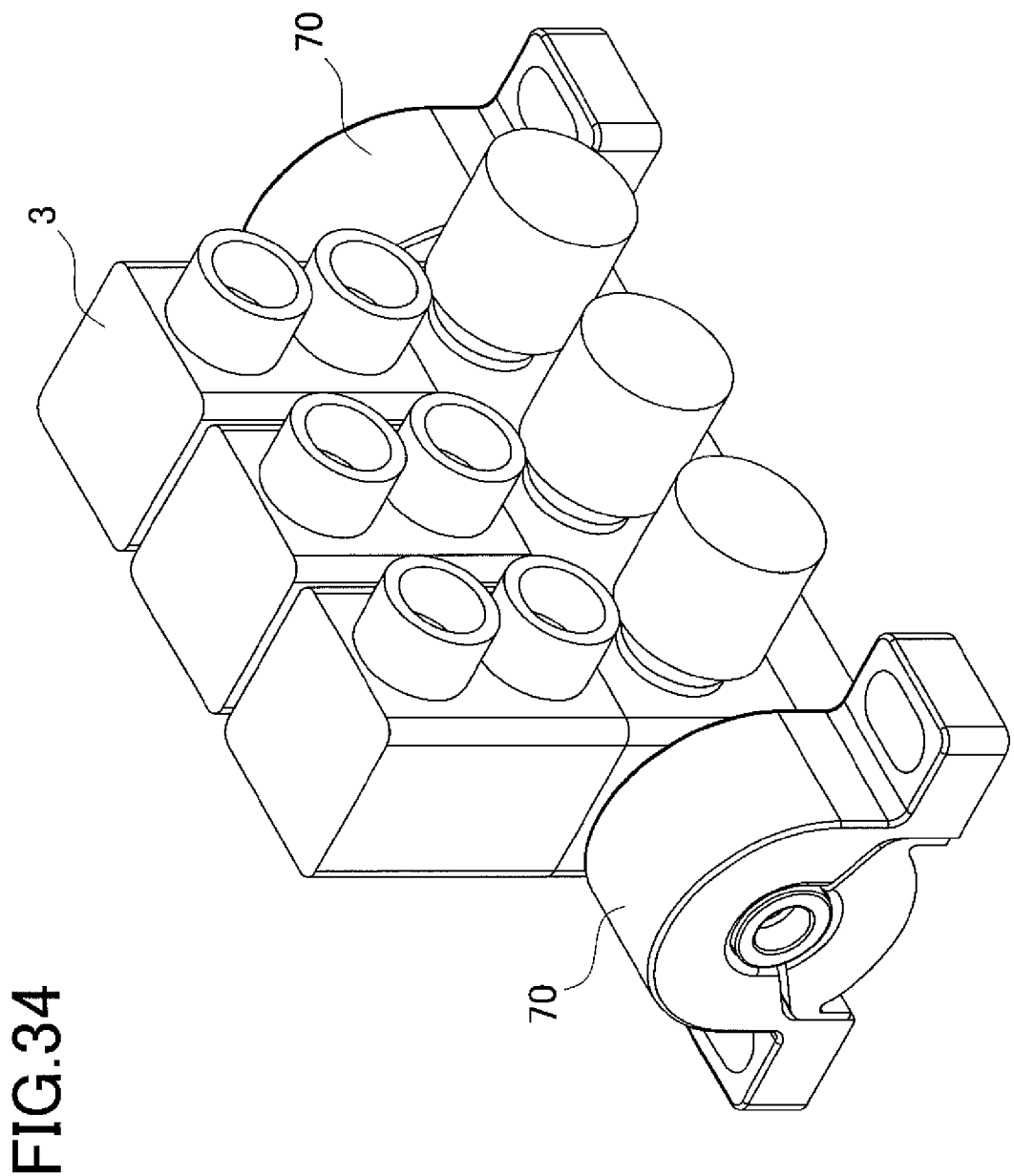
FIG. 34 is an external perspective front view of the fluid control device manifold (mounted on a floor) in the second embodiment.
Figure 35:
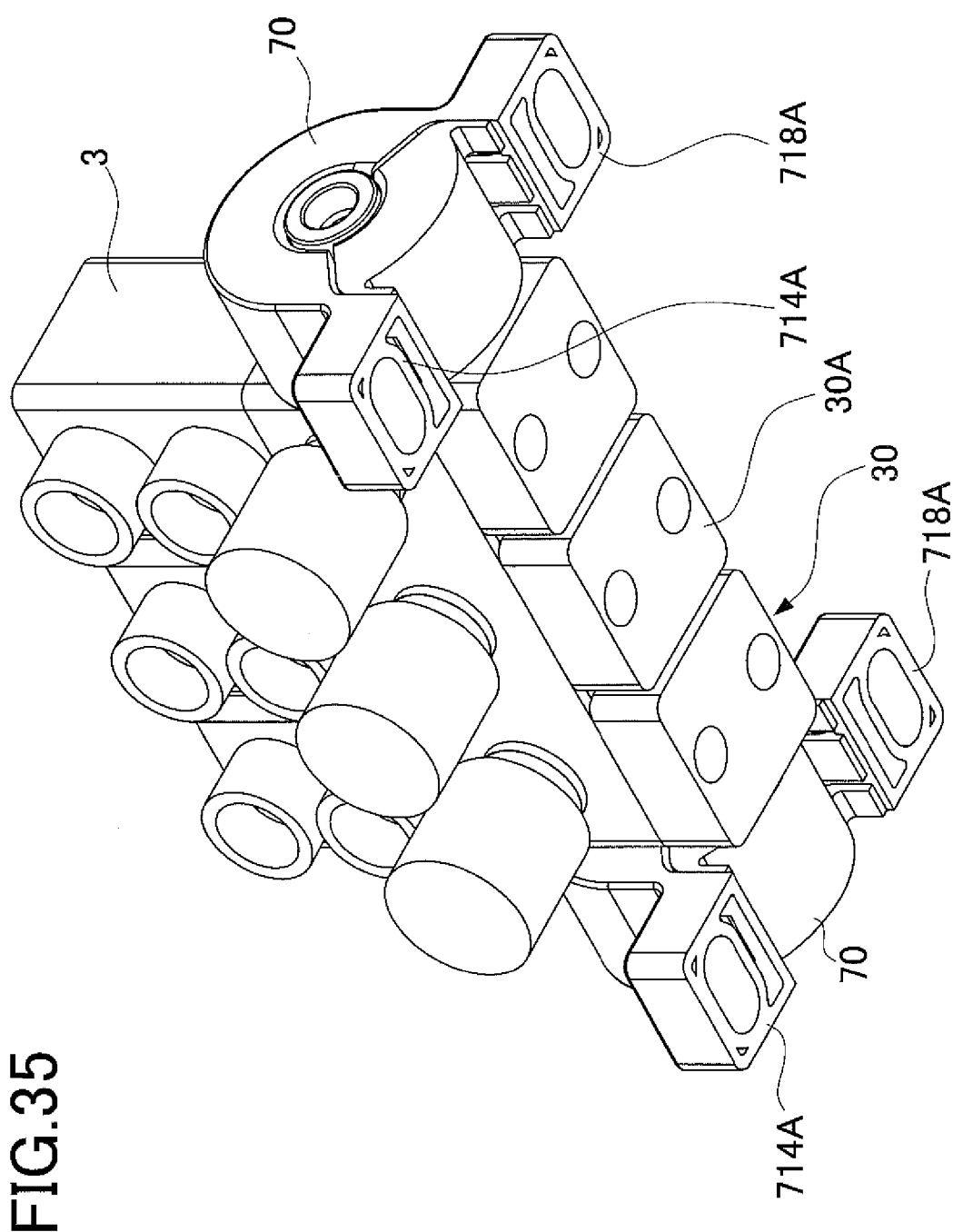
FIG. 35 is an external perspective back view of the fluid control device manifold (mounted on the floor) in the second embodiment.
Figure 36:
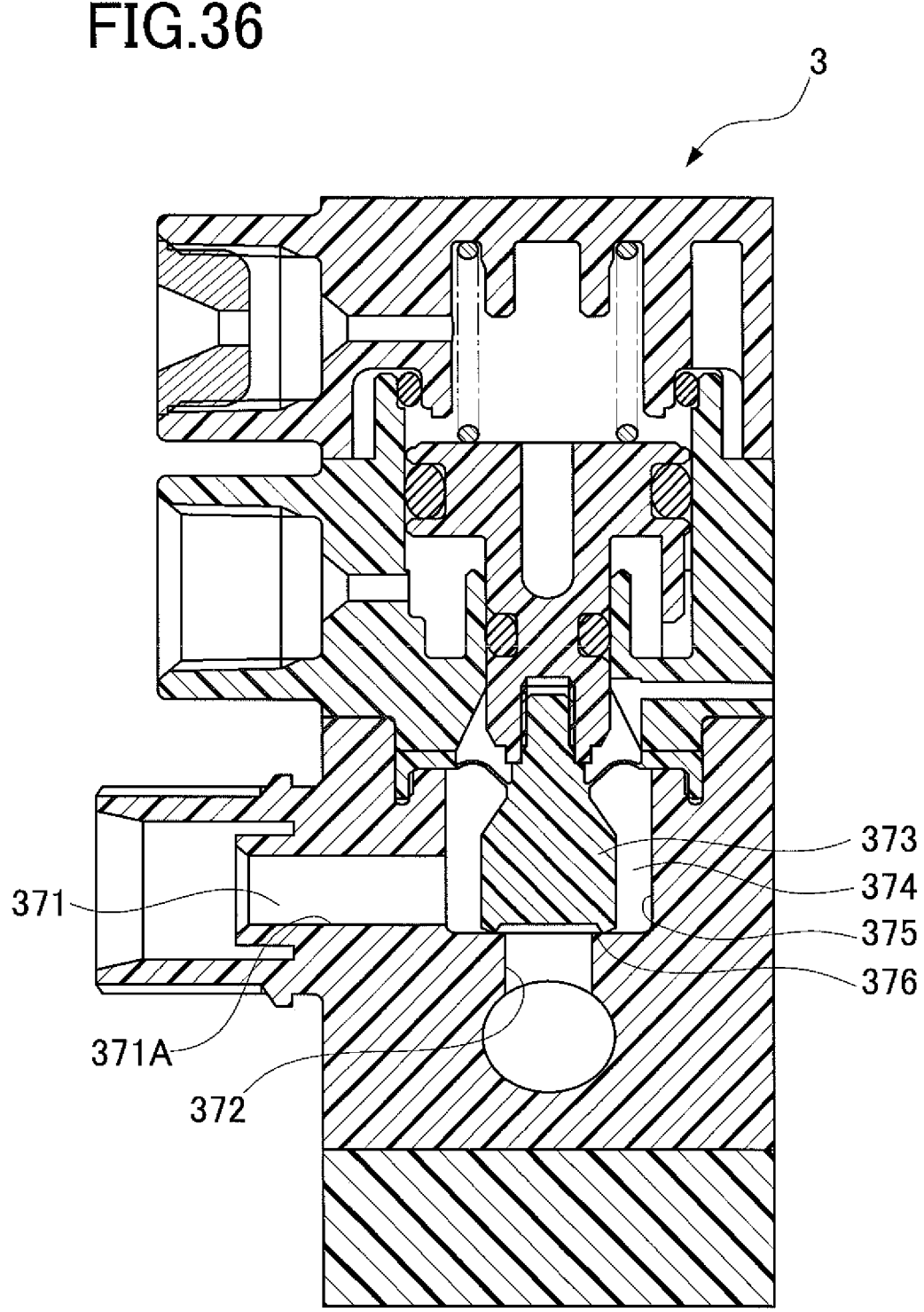
FIG. 36 is an I-I cross section view of the fluid control device manifold shown in FIG. 30 in the second embodiment.
Figure 37:
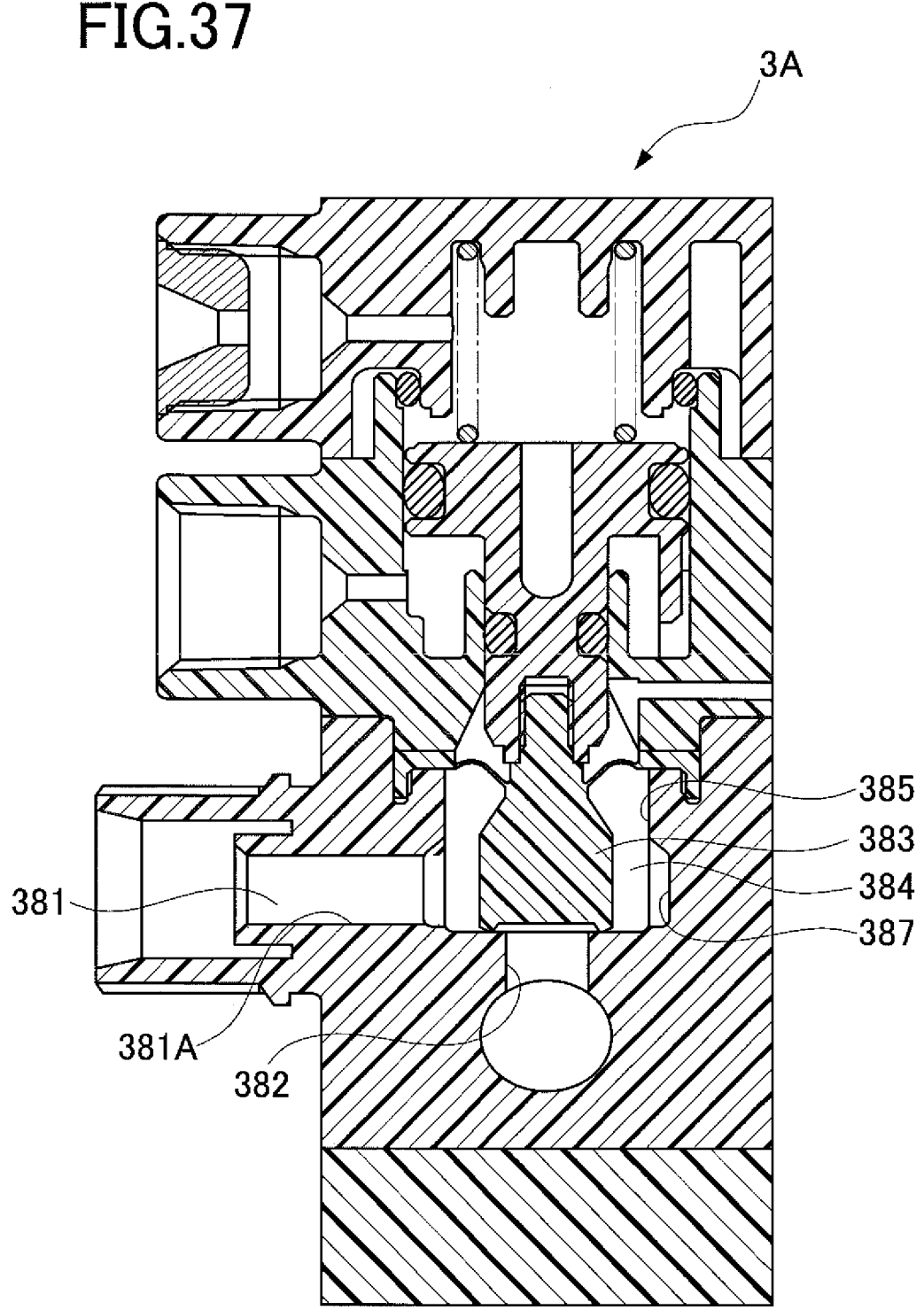
FIG. 37 is the I-I cross section view of the fluid control device manifold (2) shown in FIG. 30 in the second embodiment.
Figure 38:
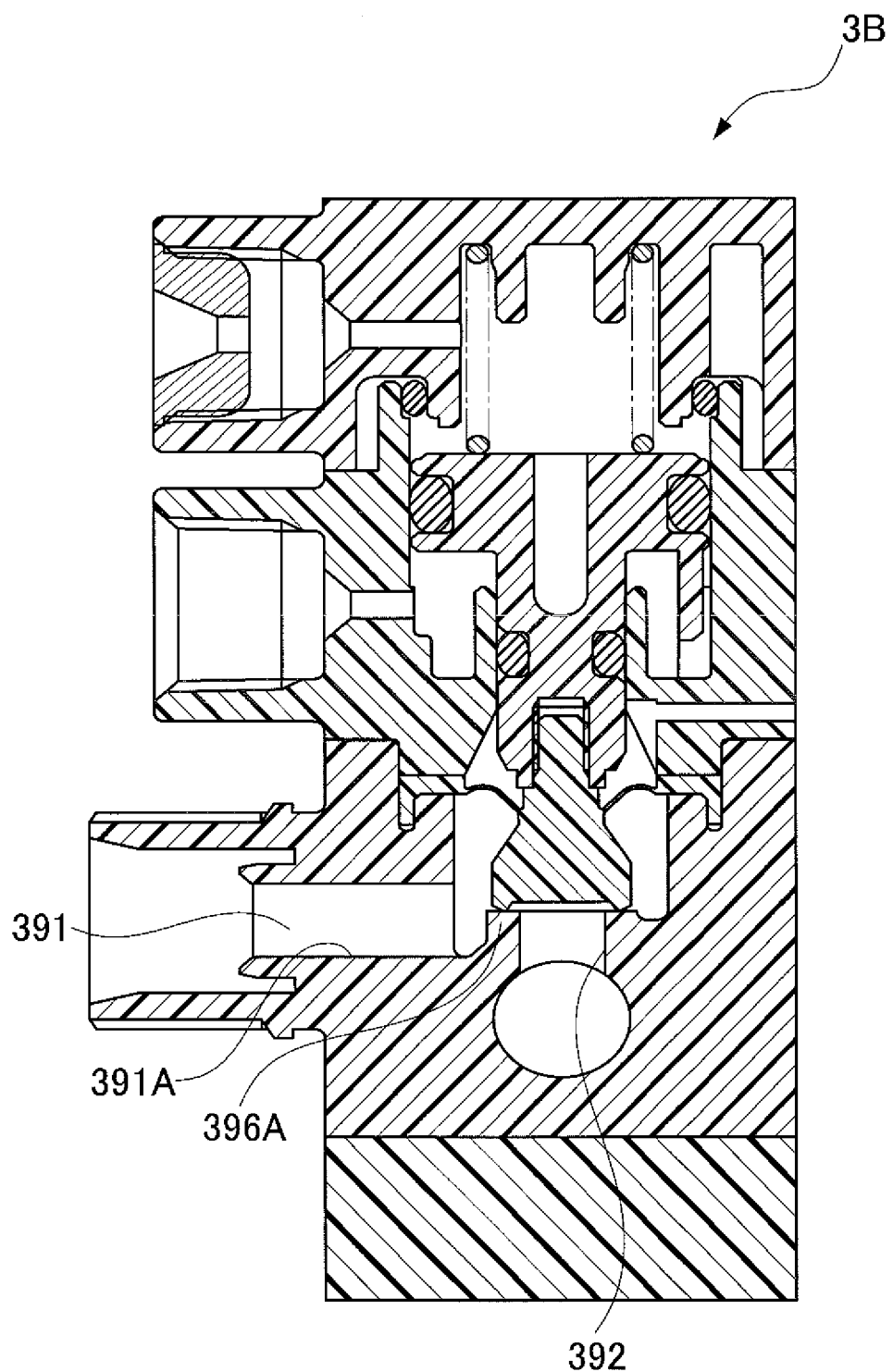
FIG. 38 is a cross section view of a fluid control device manifold in a conventional art, corresponding to the I-I cross section view of the fluid control device manifold shown in FIG. 30.

A fluid control device manifold 50 in a second embodiment will be explained referring to FIGS. 30 to 38. FIG. 30 is a front view of a fluid control device manifold 50. FIG. 31 is an H-H cross section view of the fluid control device manifold 50 in FIG. 30. FIG. 32 is an external perspective front view of the fluid control device manifold 50 (mounted on a wall). FIG. 33 is an external perspective back view of the fluid control device manifold 50 (mounted on the wall). FIG. 34 is an external perspective front view of the fluid control device manifold 50 (mounted on a floor). FIG. 35 is an external perspective back view of the fluid control device manifold 50 (mounted on the floor). FIG. 36 is an I-I cross section view of the fluid control device manifold 50 shown in FIG. 30. FIG. 37 is an I-I cross section view of a fluid control device manifold (2) shown in FIG. 30. FIG. 38 is a cross section view of a fluid control manifold in a conventional art and corresponds to the I-I cross section of the fluid control device manifold shown in FIG. 30.

<Whole Structure of Fluid Control Device Manifold>

Similar or identical parts of the fluid control device manifold 50 in the second embodiment to those in the first embodiment are not explained in detail. The fluid control device manifold 1 in the first embodiment is referred to as the fluid control device manifold 50 in the second embodiment. Further, similar or identical members of the fluid control device manifold 50 in the second embodiment to those of the fluid control device manifold 1 in the first embodiment are assigned the same reference signs as those in the first embodiment and their explanations are omitted.

As shown in FIG. 33, a plurality of anti-rotation protruding portions 3X are provided on a peripheral wall 304D of the main part 30 having a nearly rectangular parallelepiped shape to be mounted on a wall. Fixed-plate contact surfaces 3XA of the anti-rotation protruding portions 3X are formed to be flush with contact surfaces 714A and 718A of each clamp 70. The presence of the anti-rotation protruding portions 3X can keep the main part 30 and the clamps 70 in a nearly flush position when they are mounted on the wall, thereby bridging or spanning a gap between the main part 30 and the wall. Specifically, since the gap is present between the peripheral wall 304D of the main part 30 and the wall, the anti-rotation protruding portions 3X provided to place the contact surfaces 3XA of the anti-rotation protruding portions 3X and the contact surfaces 714A and 718A of the clamps 70 and the wall in the same plane, the main part 30 can be prevented from rattling such as rotating. Further, the anti-rotation protruding portions 3X are preferably designed to generate a slight clearance with respect to a mounting wall. Accordingly, when the main part 30 is fixed by the clamps 70, it is possible to prevent application of an excessive force to the clamps 70 and the main part 30.

Further, the presence of the anti-rotation protruding portions 3X bridges a gap between the main part and the wall surface, thus enhancing the strength of the main part 30. Specifically, in a case where a large gap is present between the clamps 70 and the main part 30, when a force acts on the main part 30 in a direction toward the wall during a mounting work, the main part 30 is warped and the connection parts and the main part 30 are subjected to stress. Since the anti-rotation protruding portions 3X are formed, bridging a gap between the main part 30 and the wall, thereby preventing warping, the stress to the connection parts and the main part 30 can be reduced.

As shown in FIG. 35, a floor contact surface 30A of the main part 30 and the contact surfaces 714A and 718A of each clamp 70 are in nearly the same plane. Accordingly, the floor contact surface 30A needs not be formed with the anti-rotation protruding portions 3X. In a case where the floor contact surface 30A and the contact surfaces 714A and 718A are not flush, the anti-rotation protruding portions 3X may be provided in a similar manner as in the above case of mounting to the wall. In this case, the anti-rotation protruding portions 3X with contact surfaces contacting the wall bridge a gap between the main part 30 and the wall, thereby preventing rattling such as rotating. Further, the floor contact surfaces 30A are designed with a slight clearance with respect to the mounting wall.

As shown in FIG. 36, a valve chamber 374 is formed in the second body 3, a first communication passage 371 and a second communication passage 372 are communicated with the vale chamber 374. A valve seat 376 is formed in a lower surface of the valve chamber 374. Further, a diaphragm 373 is mounted slidably to come into or out of contact with a valve seat 376. The valve chamber 374 is formed, on its inner peripheral side, a wall surface 375 is formed.

As shown in FIG. 36, a passage side surface 371A of the first communication passage 371 is formed at almost the same height, or level, as the valve seat 376. Accordingly, a fluid flowing in the first communication passage 371 is allowed to flow in the second communication passage 372 without decreasing in speed by a joint with the valve seat 376.

To be concrete, in a conventional second body 3B, a valve seat part 396A is formed between a passage side surface 391A of a first communication passage 391. Thus, a fluid flowing through the first communication passage 391 impinges on the valve seat part 396A. The valve seat part 396A thus blocks a flow of the fluid, resulting in poor flow from the first communication passage 391 to a second communication passage 392.

Comparing between the body formed with the conventional valve seat part 396A, the body formed with the passage side surface 371A formed at nearly the same height as the valve seat 376 according to the invention will not cause interference with a flow of fluid because of the absence of the seat 396A.

Further, in a case of FIG. 37, a wall surface part 385 of a valve chamber 384 is formed with a large-diameter portion 387 radially increasing in diameter with respect to the center axis of a valve element 383. The large-diameter portion 387 has an increased diameter by drilling or digging the wall surface part 385. Since the large-diameter part 387 is formed, the volume of the valve chamber 384 is increased. Because the volume is increased, the fluid allowed to flow in the valve chamber 384 is increased. This can further improve a flow from the first communication passage 381 to the second communication passage 382.

As an alternative, the fluid is allowed to flow from the second communication passage 382 to the first communication passage 381.

<Structure of Clamp>

The clamp 70 shown in FIG. 30 is a member for holding the first connection part of the first body 2 and the second connection part of the second body 3 in a state where they are press-fitted in the seal member.

As shown in FIG. 31, the clamp 70 consists of a first clamp member 71 and a second clamp member 72.

A holding part 711 is formed with a fan-like first holding groove 712 as shown in FIG. 31. A holding side surface 717 of the first holding groove 712 is planar and will be located in parallel with the first connection-part holding surface 4f of the connection part when the holding surface 4f of the connection part is completely press-fitted in the seal member 6.

Further, as with the first clamp member 71, the second clamp member 72 is also internally formed with a fan-like second holding groove 722 and a holding side surface 727. When the first clamp member 71 and the second clamp member 72 are engaged with each other, the holding groove 710 is formed to cover and hold the connection parts completely press-fitted in the seal member 6.

The diameter of the holding groove 710 constituted of the first holding groove 712 and the second holding groove 722 is slightly larger than the diameter of the connection part 4. Therefore, as shown in FIG. 31, when the connection part is held in the holding groove 710, a gap X is generated between the holding groove 710 and the connection part 4.

The first holding groove 712 is formed to engage with the connection part over a range exceeding one-half of the entire circumference as shown in FIG. 31. In the present embodiment, concretely, the first holding groove 712 is formed to engage with a portion of the connection part exceeding two-thirds of the entire circumference. Accordingly, while the first clamp member 71 alone temporarily holds the connection part, the second clamp member 72 can be attached. Thus, good workability is achieved. Since the structural strength of the first clamp member 71 can be enhanced, thereby enabling breakage of the clamp 70. The first clamp member 71 placed to cover the connection part from above has a large engagement area, so that it is less likely to disengage even when subjected to impact or the like.

In the present embodiment, the first holding groove 712 engages with the portion beyond two-thirds of the entire circumference of the connection parts 4 and 5. As long as it engages with one-half portion or more, however, the same operation advantage as in the case of the engagement with the two-third portion or more can be achieved.

Moreover, at both ends of the holding part 711, fitting recesses 713 are formed to engage with fitting protruding portions 723 of the second clamp member 72 as shown in FIG. 31. When the protruding portions 723 are engaged in the recesses 713, the first clamp member 71 and the second clamp member 72 can hold the connection parts in a covered state.

As shown in FIG. 31, the first clamp member 71 includes a first mounting part 714 and a second mounting part 718 for fixation to the fixed plate 80 in addition to the holding part 711 for holding the connection parts.

The first mounting part 714 includes a contact surface 714A which will contact with the fixed plate 80 and a screw hole 715 for fixation to the fixed plate. The first mounting part 714 is a nearly rectangular parallelepiped block extending vertically from one end of the holding part 711. Similarly, the second mounting part 718 includes a contact surface 718A which will contact with the fixed plate 80 and a screw hole 719 for fixation to the fixed plate. The second mounting part 718 is also a nearly rectangular parallelepiped block vertically extending from one end of the holding part 711.

As shown in FIG. 31, the first clamp member 71 attached with the second clamp member 72 is fixed to the fixed plate 80 with the fixing screws 85 inserted in the screw hole 715 and the screw hole 719. Accordingly, the second clamp member 72 is surrounded by the first clamp member 71, the first body 2, the second body 3, and the fixed plate 80, so that the second clamp member 72 is prevented from erroneously detaching from the first clamp member 71 by external force.

In the second embodiment, furthermore, the clamp can be fixed to the fixed plate 80 at two places, i.e., the first mounting part 714 and the second mounting part 718. In the first embodiment, the mounting part is formed only at one end. In this case where the mounting part is formed only at one end, the other end is free, or unfixed. The present applicant ascertained that an operator is apt to touch such a free end by hand. Since the clamp is fixed to the fixed plate 80 by two places, i.e., the first mounting part 714 and the second mounting part 718, it is possible to prevent the above problem that an operator touches the first clamp member 71 by hand, causing detachment of the first clamp member 71 or the like.

Moreover, since the clamp is fixed at two places, i.e., the first mounting part 714 and the second mounting part 718, the clamp is not detached even when receives pressing force from the first mounting part 714 side and the second mounting part 718 side.

REFERENCE SIGNS LIST

1, 50 Fluid control device manifold
2 First body
3 Second body
214, 224, 314, 324 First screw hole
215, 225, 315, 325 Second screw hole
216, 226 First screw hole engagement surface
217, 227 Second screw hole engagement surface
4 First connection part
5 Second connection part
6 Seal member
40 Connecting tool
60, 70 Clamp

The invention claimed is:

1. A fluid control device manifold comprising:
a first body,
a second body, and
a connection part configured to interpose a seal member between the first and second bodies, the seal member being in a press-fitted state in the first and second bodies in a manner that a connecting tool is engaged with engagement surfaces of the first body and the second body and a load is applied to the engagement surfaces to draw the first body and the second body toward each other, and the press-fitted state is held by a clamp,
wherein a main part of either or both of the first body and the second body is formed with a valve hole and a flow passage, the valve hole being located above the flow passage, the flow passage having a center axis along which a fluid passes, the main part is formed with a recess on an outer surface of the main part below the flow passage, the recess recessing from the outer surface towards the flow passage, the recess is provided with the engagement surface extending in a direction intersecting the center axis of the flow passage, the clamp includes a first clamp member and a second clamp member, the clamp is configured to clamp the connection part, and the engagement surfaces include a surface provided in a screw hole of either or both of the first body and the second body.

2. The fluid control device manifold according to claim 1, wherein the engagement surfaces include a surface provided in a molding cutout of either or both of the first body and the second body.

3. The fluid control device manifold according to claim 1, wherein the engagement surface has a range determined such that a farthest distance from an end face of the main part on a side for insertion of the connecting tool is larger than a distance between the end face and a center axis of the seal member.

4. The fluid control device manifold according to claim 1, wherein the first clamp member includes a mounting surface to be fixed to a fixed plate, and the first clamp member and the second clamp member are unable to disassemble when the mounting surface contacts with the fixed plate.

5. The fluid control device manifold according to claim 4, wherein the first clamp member engages with a portion of the connection part exceeding one-half of an entire circumference of the connection part.

6. The fluid control device manifold according to claim 1, wherein the clamp and the connection part have engagement surfaces parallel with each other.

7. The fluid control device manifold according to claim 1, including another component mounted on either or both of the first body and the second body after the first body and the second body are drawn toward each other to place the seal member in the press-fitted state.

8. A fluid control device manifold comprising:

a first body, a second body, and a connection part configured to interpose a seal member between the first and second bodies, the seal member being in a press-fitted state in the first and second bodies in a manner that a connecting tool is engaged with engagement surfaces of the first body and the second body and a load is applied to the engagement surfaces to draw the first body and the second body toward each other, and the press-fitted state is held by a clamp, wherein a main part of either or both of the first body and the second body is formed with a valve hole and a flow passage, the valve hole being located above the flow passage, the flow passage having a center axis along which a fluid passes, the main part is formed with a recess on an outer surface of the main part below the flow passage, the recess recessing from the outer surface towards the flow passage, the recess is provided with the engagement surface extending in a direction intersecting the center axis of the flow passage, the clamp includes a first clamp member and a second clamp member, the clamp is configured to clamp the connection part, either or both of the first body and the second body are provided with at least two or more valve seats, and the engagement surfaces include a partition wall between the valve seats.

9. The fluid control device manifold according to claim 8, wherein the engagement surfaces include a surface provided in a molding cutout of either or both of the first body and the second body.

10. The fluid control device manifold according to claim 8, wherein the engagement surface has a range determined such that a farthest distance from an end face of the main part on a side for insertion of the connecting tool is larger than a distance between the end face and a center axis of the seal member.

11. The fluid control device manifold according to claim 8, wherein the first clamp member includes a mounting surface to be fixed to a fixed plate, and the first clamp member and the second clamp member are unable to disassemble when the mounting surface contacts with the fixed plate.

12. The fluid control device manifold according to claim 11, wherein the first clamp member engages with a portion of the connection part exceeding one-half of an entire circumference of the connection part.

13. The fluid control device manifold according to claim 8, wherein the clamp and the connection part have engagement surfaces parallel with each other.

14. The fluid control device manifold according to claim 8, including

Another component mounted on either or both of the first body and the second body after the first body and the second body are drawn toward each other to place the seal member in the press-fitted state.

15. A fluid control device manifold comprising:

a first body, a second body, and a connection part configured to interpose a seat member between the first and second bodies, the seal member being in a press-fitted state in the first and second bodies in a manner that a connecting tool is engaged with engagement surfaces of the first body and the second body and a load is applied to the engagement surfaces to draw the first body and the second body toward each other, and the press-fitted state is held by a clamp, wherein a main part of either or both of the first body and the second body is formed with a valve hole and a flow passage, the valve hole being located above the flow passage, the flow passage having a center axis along which a fluid passes, the main part is formed with a recess on an outer surface of the main part below the flow passage, the recess recessing from the outer surface towards the flow passage, the recess is provided with the engagement surface extending in a direction intersecting the center axis of the flow passage, the clamp includes a first clamp member and a second clamp member, the clamp is configured to clamp the connection part, and the first body and the second body each include two or three valve seats and the connection part includes connection parts in more than one place.

16. The fluid control device manifold according to claim 15, wherein the engagement surfaces include a surface provided in a molding cutout of either or both of the first body and the second body.

17. The fluid control device manifold according to claim 15, wherein the engagement surface has a range determined such that a farthest distance from an end face of the main part on a side for insertion of the connecting tool is larger than a distance between the end face and a center axis of the seal member.

18. The fluid control device manifold according to claim 15, wherein
the first clamp member includes a mounting surface to be fixed to a fixed plate, and
the first clamp member and the second clamp member are unable to disassemble when the mounting surface contacts the fixed plate.

19. The fluid control device manifold according to claim 15, wherein the clamp and the connection part have engagement surfaces parallel with each other.

20. The fluid control device manifold according to claim 15, including
another component mounted on either or both of the first body and the second body after the first body and the second body are drawn toward each other to place the seal member in the press-fitted state.

* * * * *